(12) United States Patent
Hashizume et al.

(10) Patent No.: US 12,556,832 B2
(45) Date of Patent: Feb. 17, 2026

(54) CLIPPED IMAGING DEVICE, SYSTEM, AND METHOD

(71) Applicant: Sony Semiconductor Solutions Corporation, Kanagawa (JP)

(72) Inventors: Yuuki Hashizume, Kanagawa (JP); Masatoshi Suzuki, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 17/802,728

(22) PCT Filed: Mar. 2, 2021

(86) PCT No.: PCT/JP2021/007987
§ 371 (c)(1),
(2) Date: Aug. 26, 2022

(87) PCT Pub. No.: WO2021/182190
PCT Pub. Date: Sep. 16, 2021

(65) Prior Publication Data
US 2023/0098440 A1    Mar. 30, 2023

(30) Foreign Application Priority Data
Mar. 11, 2020 (JP) ................. 2020-042360

(51) Int. Cl.
*H04N 25/47* (2023.01)
*H04N 23/61* (2023.01)
*H04N 25/443* (2023.01)

(52) U.S. Cl.
CPC ............ *H04N 25/47* (2023.01); *H04N 23/61* (2023.01); *H04N 25/443* (2023.01)

(58) Field of Classification Search
CPC .................................................. H04N 25/443
See application file for complete search history.

(56) References Cited

U.S. PATENT DOCUMENTS

2011/0007175 A1* 1/2011 Fujita .................. G03B 5/00
348/222.1
2011/0141318 A1* 6/2011 Lee ...................... H04N 23/57
348/222.1

FOREIGN PATENT DOCUMENTS

| CN | 101018299 A | 8/2007 |
| CN | 101897174 A | 11/2010 |
| CN | 102291569 A | 12/2011 |

(Continued)

OTHER PUBLICATIONS

International Search Report (PCT/ISA/210), International Application No. PCT/JP2021/007987, dated Jun. 1, 2021.

*Primary Examiner* — Tracy Y. Li
(74) *Attorney, Agent, or Firm* — Michael Best & Friedrich LLP

(57) ABSTRACT

A moving object is detected and tracked accurately and a region of interest including the moving object is output at high resolution without increasing power consumption. An imaging device includes: a pixel array unit that has a plurality of pixel circuits and can clip a first pixel region which is a part of an effective pixel region and output pixel data in the first pixel region; and a signal processing unit that detects and tracks a moving object in the first pixel region based on the pixel data output from the pixel array unit in the first pixel region, clips a second pixel region which is a part of the first pixel region, and outputs pixel data in the second pixel region.

20 Claims, 20 Drawing Sheets

(56) References Cited

FOREIGN PATENT DOCUMENTS

| | | | |
|---|---|---|---|
| CN | 102480591 | A | 5/2012 |
| CN | 103996208 | A | 8/2014 |
| CN | 104699238 | A | 6/2015 |
| CN | 105100587 | A | 11/2015 |
| CN | 106060377 | A | 10/2016 |
| CN | 106097726 | A | 11/2016 |
| CN | 107786812 | A | 3/2018 |
| CN | 110199316 | A | 9/2019 |
| JP | 2000295517 | A | 10/2000 |
| JP | 2005269121 | A | 9/2005 |
| JP | 2008283230 | A | 11/2008 |
| JP | 2009147727 | A | 7/2009 |
| JP | 2010056723 | A | 3/2010 |
| JP | 2013162425 | A | 8/2013 |
| JP | 2019134202 | A | 8/2019 |
| JP | 2020014195 | A | 1/2020 |

\* cited by examiner

1: IMAGING DEVICE

20: IMAGING SYSTEM

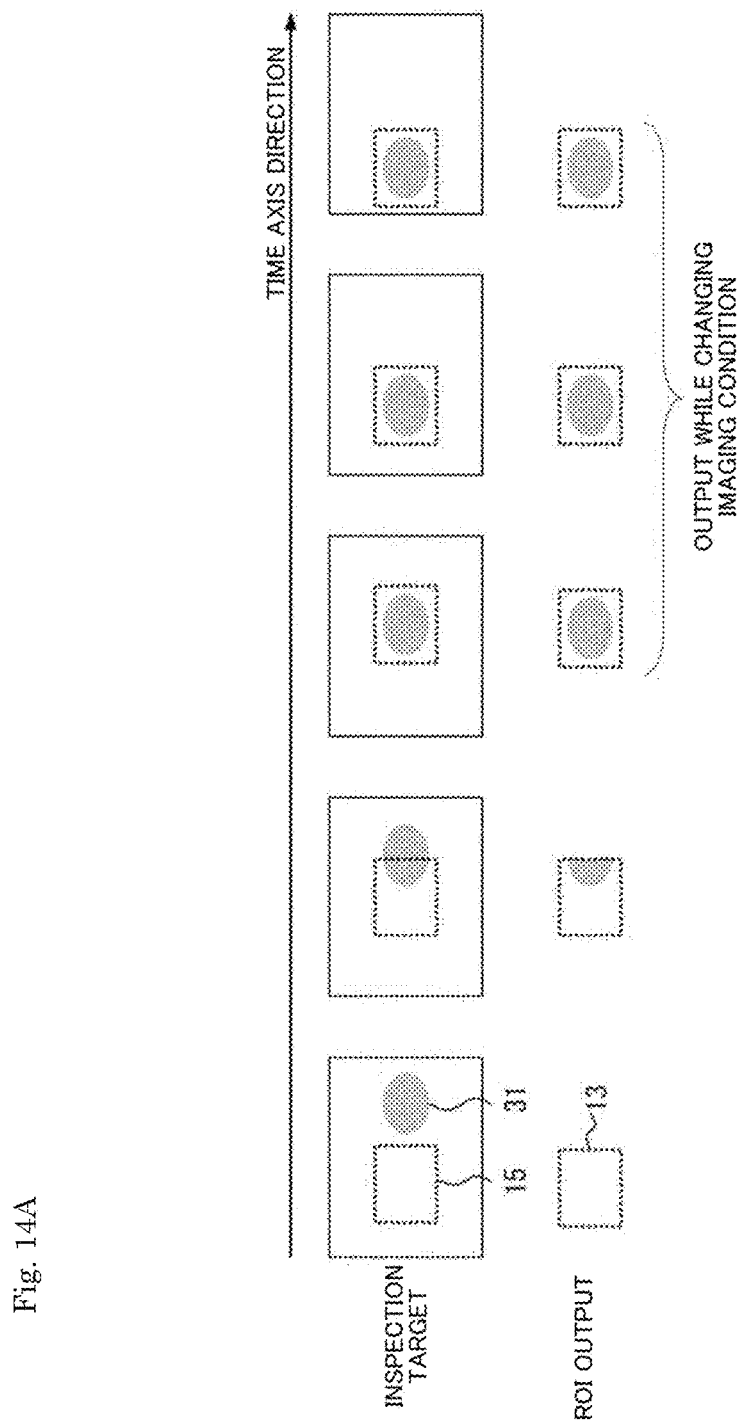

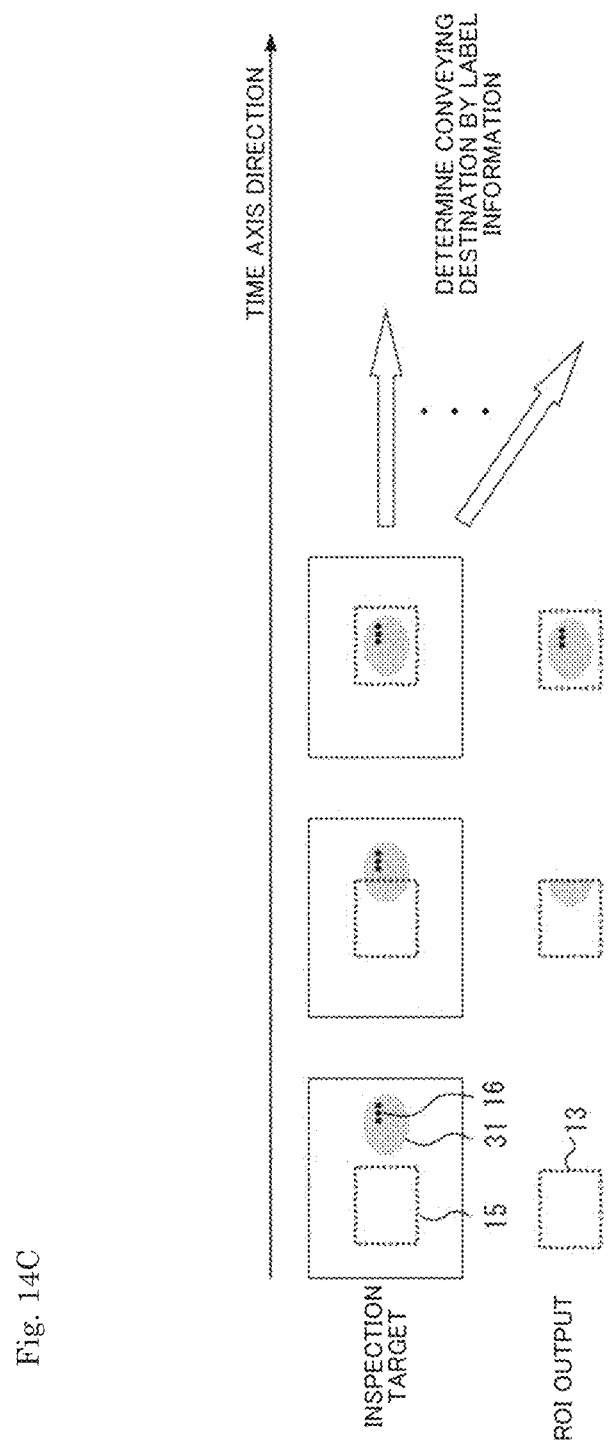

CLIPPED IMAGING DEVICE, SYSTEM, AND METHOD

TECHNICAL FIELD

The present disclosure relates to an imaging device, an imaging system, and an imaging method.

BACKGROUND ART

An imaging device has been proposed that outputs only a part of a region of interest (ROI) within an effective pixel region that can be imaged by the imaging device with a high resolution (PTL 1). In PTL 1, only the region of interest is photographed at high resolution and output, and the entire image is photographed at low resolution to track a moving object, thereby reducing the power consumption of the imaging device.

CITATION LIST

Patent Literature

[PTL 1]
JP 2019-134202 A

SUMMARY

Technical Problem

In PTL 1, the detection and tracking of a moving object is performed by a signal processing unit connected to the imaging element, and the imaging element switches the region of interest to be output at high resolution based on the signal output from the signal processing unit. Therefore, for a fast moving object, it may be difficult for the imaging element to output the pixel data in the region of interest without delay.

Further, since the imaging element must always output low-resolution pixel data for all pixels, there is a problem that power consumption is high.

On the other hand, as a modification of PTL 1, an imaging system is considered in which low-resolution pixel data is once generated and output inside an imaging element, detection and tracking of a moving object is performed inside the imaging element to output information on the region of interest, and the region of interest is clipped by a signal processing unit connected to the imaging element. In the case of this imaging system, since the region of interest has low resolution, the system cannot be used for the purpose of visually recognizing the region of interest at high resolution.

Therefore, the present disclosure provides an imaging device, an imaging system, and an imaging method capable of accurately detecting and tracking a moving object and outputting a region of interest including the moving object at high resolution without increasing power consumption.

Solution to Problem

In order to solve the problem, according to the present disclosure, there is provided an imaging device including: a pixel array unit that has a plurality of pixel circuits and can clip a first pixel region which is a part of an effective pixel region and output pixel data in the first pixel region; and a signal processing unit that detects and tracks a moving object in the first pixel region based on the pixel data output from the pixel array unit in the first pixel region, clips a second pixel region which is a part of the first pixel region, and outputs pixel data in the second pixel region.

The signal processing unit may clip the second pixel region from the first pixel region without degrading a pixel resolution.

When the moving object is present in the first pixel region, the signal processing unit may clip the second pixel region so as to follow a position of the moving object.

The signal processing unit may detect and track the moving object based on the pixel data in the first pixel region.

The signal processing unit may output a signal indicating a range in which the pixel array unit clips from the effective pixel region in a next frame based on the position of the moving object in the first pixel region, and the pixel array unit may clip the first pixel region based on the signal output from the signal processing unit.

The signal processing unit may include: a first processing unit that detects and tracks the moving object based on the pixel data in the first pixel region, and a second processing unit that clips the second pixel region from the first pixel region based on a signal indicating a result of detecting and tracking the moving object obtained by the first processing unit.

The imaging device may further include a clipping driving unit that controls the first pixel region output by the pixel array unit for each frame, and the first processing unit may output first control information indicating a range to be clipped from the first pixel region to the second processing unit and output second control information indicating the range of the first pixel region to be clipped from the effective pixel region to the clipping driving unit.

The first processing unit may set a tracking detection frame in the first pixel region, and when the moving object is detected in the tracking detection frame, perform a process of moving the tracking detection frame according to the position of the moving object in the first pixel region, and output the first control information and the second control information.

The imaging device may include a storage unit that stores at least one of a clipping condition in the signal processing unit and a condition for detecting and tracking the moving object in the first pixel region, and the signal processing unit may detect and track the moving object and clip the second pixel region according to the condition stored in the storage unit.

The storage unit may store information on whether or not to detect and track the moving object, information on initial coordinates and size of the second pixel region, and information for detecting the moving object in the first pixel region.

The information for detecting the moving object in the first pixel region may include at least one of time information for determining that the moving object that has been tracked has disappeared from the first pixel region; information on a color filter used for generating image data for facilitating detection and tracking of the moving object; information on a threshold value when generating the image data; and information on a threshold value of a size of the moving object.

The imaging device may further include an output rate control unit that controls an output rate when the pixel data output from the signal processing unit is externally output according to a size of the second pixel region.

The pixel array unit may have the plurality of pixel circuits arranged in a first direction and a second direction, and the pixel array unit may clip the first pixel region along at least one of the first direction and the second direction.

The pixel array unit may have the plurality of pixel circuits arranged in a first direction and a second direction, the pixel array unit may clip the first pixel region along the first direction, and the signal processing unit may clip the second pixel region from the first pixel region along the second direction.

According to the present disclosure, there is provided an imaging system including: an imaging device; and an information processing device that inputs a condition for clipping a pixel region and a condition for detecting and tracking a moving object to the imaging device, the imaging device including: a pixel array unit that has a plurality of pixel circuits and can clip a first pixel region which is a part of an effective pixel region and output pixel data in the first pixel region; and a signal processing unit that detects and tracks a moving object in the first pixel region based on the pixel data output from the pixel array unit, clips a second pixel region which is a part of the first pixel region, and outputs pixel data in the second pixel region.

According to the present disclosure, there is provided an imaging method including: clipping a first pixel region which is a part of an effective pixel region from a pixel array unit having a plurality of pixel circuits; and outputting pixel data in the first pixel region, detecting and tracking a moving object in the first pixel region based on the output pixel data, clipping a second pixel region which is a part of the first pixel region, and outputting pixel data in the second pixel region.

BRIEF DESCRIPTION OF DRAWINGS

FIG. 14A is a diagram showing an example in which a detected moving object is imaged a plurality of times under different imaging conditions.

FIG. 14C is a diagram showing an example of sorting inspection target objects using an imaging device.

DESCRIPTION OF EMBODIMENTS

Hereinafter, embodiments of an imaging device and an imaging system will be described with reference to the drawings. Hereinafter, main components of the imaging device and the imaging system will be mainly described, but the imaging device and the imaging system may have components or functions that are not illustrated or described. The following description does not exclude components or functions that are not illustrated or described.

First Embodiment

Figure 1:
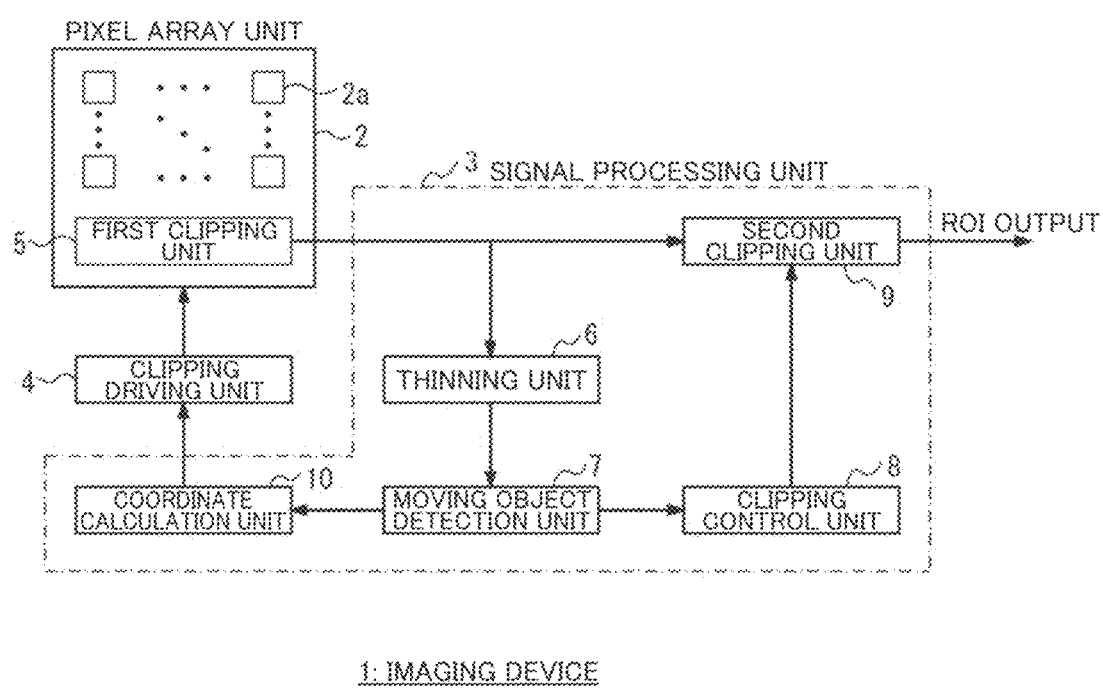
FIG. 1 is a block diagram illustrating main parts of an imaging device according to a first embodiment.

FIG. 1 is a block diagram illustrating main parts of an imaging device 1 according to a first embodiment. The imaging device 1 of FIG. 1 shows, for example, the configuration of a CIS (CMOS Image Sensor). The imaging device 1 of FIG. 1 is often made into a chip and may be referred to as an imaging element, but is referred to as an imaging device 1 in the present specification.

The imaging device 1 of FIG. 1 includes a pixel array unit 2, a signal processing unit 3, and a clipping driving unit 4. The pixel array unit 2 has a plurality of pixel circuits 2a, clips a first pixel region which is a part of an effective pixel region, and outputs pixel data in the first pixel region. The signal processing unit 3 detects and tracks a moving object in the first pixel region based on the pixel data output from the pixel array unit 2, clips a second pixel region which is a part of the first pixel region, and outputs the pixel data in the second pixel region. The second pixel region is a region of interest (ROI). In addition, the moving object in the present specification is a concept including not only the case where the moving object itself is moving but also a stationary object imaged by the imaging device 1 which is moving or vibrating.

The pixel array unit 2 has a plurality of pixel circuits 2a and a first clipping unit 5. Each pixel circuit 2a has a photoelectric conversion element and a readout circuit. As will be described later, the first clipping unit 5 performs a first stage of pixel clipping from the effective pixel region and outputs the pixel data in the first pixel region. The first pixel region is a region for detecting and tracking a moving object. The first pixel region may be, for example, a part of the pixel region in the vertical line direction of the effective pixel region. The first pixel region may be set to any range within the effective pixel region.

The signal processing unit 3 includes a thinning unit 6, a moving object detection unit 7, a clipping control unit 8, a second clipping unit 9, and a coordinate calculation unit 10. If the signal processing unit 3 can perform signal processing at high speed, the thinning unit 6 may be omitted.

The thinning unit 6 thins out the pixel data in the first pixel region and outputs low-resolution data. The reason why the thinning unit 6 thins out the pixel data in the first pixel region is to quickly detect and track a moving object.

The moving object detection unit 7 detects a moving object based on the low-resolution data in the first pixel region thinned out by the thinning unit 6. As will be described later, the moving object detection unit 7 continues searching until the moving object enters a tracking detection frame for tracking the moving object set in the first pixel region, and moves the tracking detection frame within the first pixel region in accordance with the movement of the moving object and tracks the moving object when the moving object enters the tracking detection frame. The moving object detection unit 7 outputs a signal indicating the moving object detection and tracking result.

The clipping control unit 8 controls the second clipping unit 9 to clip pixels in the second stage based on the output signal of the moving object detection unit 7.

The second clipping unit 9 performs a second stage of pixel clipping from the first pixel region according to the position where the moving object is present, and outputs the pixel data in the second pixel region.

The coordinate calculation unit 10 calculates the coordinates of the first pixel region in the next frame based on the output signal of the moving object detection unit 7.

The clipping driving unit 4 controls reading of pixel data from the plurality of pixel circuits 2a in the pixel array unit 2 based on the coordinates calculated by the coordinate calculation unit 10. The clipping driving unit 4 performs control of determining the range of the first pixel region in the effective pixel region in the next frame, and reading only the pixel data in the determined first pixel region from a part of the pixel circuits 2a. The range of the first pixel region may specify the coordinates and size of the first pixel region in the effective pixel region. Further, the clipping driving unit 4 may specify predetermined initial coordinates and size of the first pixel region at the time of turning on the power or resetting.

As described above, the imaging device 1 according to the present embodiment performs pixel clipping from the effective pixel region in two stages. The direction and size of pixel clipping at each stage are arbitrary, but in the following, as a typical example, an example of performing clipping of a part of the pixel region in the vertical line direction of the effective pixel region in the first stage and performing clipping of a part of the pixel region in a horizontal line direction in the second stage will be mainly described.

Figure 2:
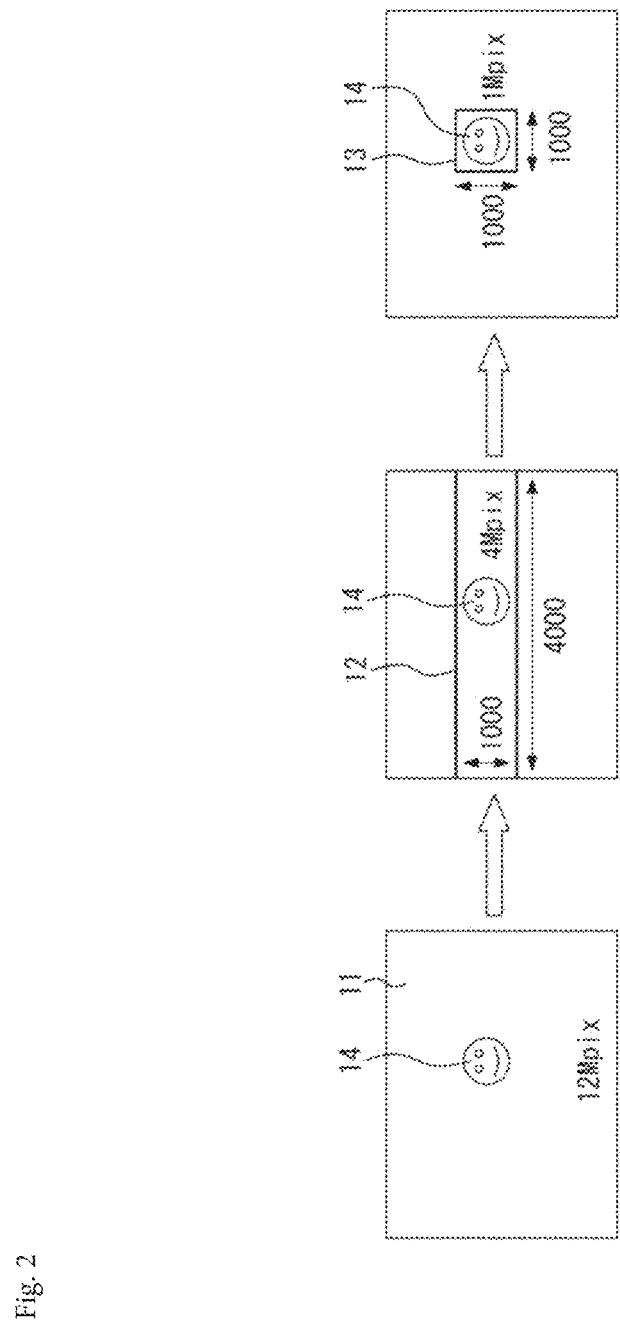
FIG. 2 is a diagram schematically illustrating the processing operation of the imaging device according to the first embodiment.

FIG. 2 is a diagram schematically illustrating the processing operation of the imaging device 1 according to the first embodiment. As shown on the left side of FIG. 2, an effective pixel region 11 of the imaging device 1 has, for example, 12M pixels. The first clipping unit 5 in the pixel array unit 2 outputs pixel data in the first pixel region 12 obtained by clipping, for example, a part of the pixel region in the vertical line direction from the effective pixel region 11. The first pixel region 12 has a size that defines a range for detecting and tracking a moving object 14. In the example of FIG. 2, the number of pixels in the first pixel region 12 is 4M pixels. Next, the second clipping unit 9 in the signal processing unit 3 outputs pixel data in the second pixel region 13 obtained by clipping, for example, a part of the pixel region in the horizontal line direction from the first pixel region 12 based on the signal indicating the moving object detection and tracking result of the moving object detection unit 7. The second pixel region 13 has a size that defines a range including a moving object. In the example of FIG. 2, the second pixel region 13 has 1M pixels.

In the present embodiment, since the pixel data in the second pixel region 13 is output at high resolution, the moving object 14 in the second pixel region 13 can be visually recognized at high resolution. Since the size of the second pixel region 13 output from the imaging device 1 is smaller than that of the first pixel region 12, the amount of pixel data output from the imaging device 1 can be suppressed.

Figure 3:
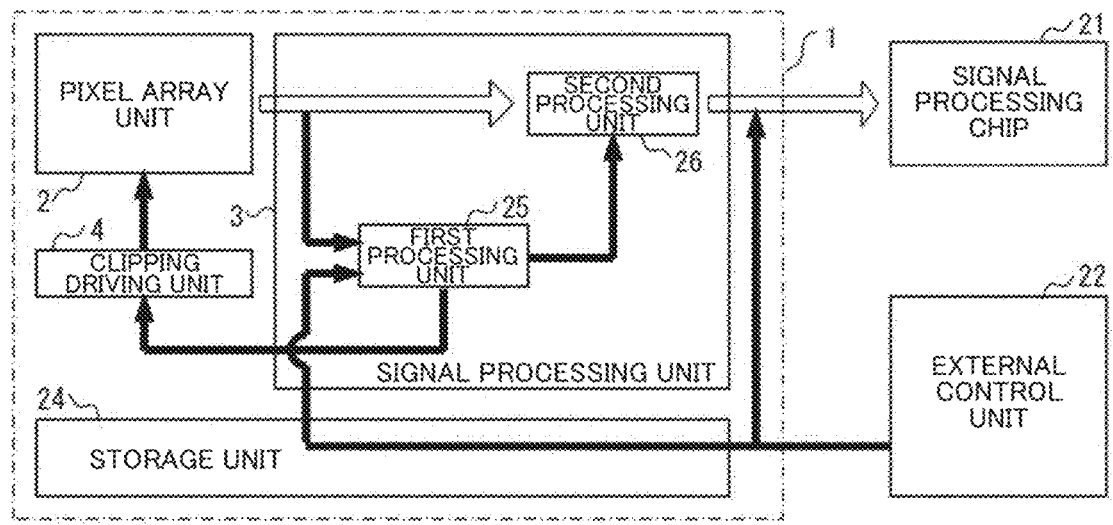
FIG. 3 is a block diagram showing a hardware configuration of an imaging system including the imaging device according to the first embodiment.

FIG. 3 is a block diagram showing a hardware configuration of an imaging system 20 including the imaging device 1 according to the first embodiment. The imaging system 20 of FIG. 3 includes the imaging device 1, a signal processing chip 21, and an external control unit 22. The signal processing chip 21 and the external control unit 22 may be integrated into one chip or may be configured as separate chips.

At least one of the signal processing chip 21 and the external control unit 22 and the imaging device 1 may be stacked one above the other and transmit and receive signals by Cu—Cu junction, TSV (Through Silicon Via), or the like. Alternatively, the chip of the imaging device 1, the signal processing chip 21, and the external control unit 22 may be mounted on a printed circuit board or the like.

The imaging device 1 of FIG. 3 includes the pixel array unit 2, the signal processing unit 3, the clipping driving unit 4, and a storage unit 24. The signal processing unit 3 has a first processing unit 25 and a second processing unit 26.

The first processing unit 25 performs processing operations of the thinning unit 6, the moving object detection unit 7, the clipping control unit 8, and the coordinate calculation unit 10 in FIG. 2. More specifically, the first processing unit 25 performs thinning-out of pixel data in the first pixel region 12, detection of moving objects, and tracking of moving objects. Further, the first processing unit 25 outputs control information (hereinafter referred to as first control information) for performing a second stage of pixel clipping to the second processing unit 26, and outputs control information (hereinafter referred to as second control information) for performing a first stage of pixel clipping in the next frame to the clipping driving unit 4. As described above, if the first processing unit 25 has processing performance for detecting and tracking a moving object at high speed, the thinning process may be omitted.

The second processing unit 26 performs clipping of a part of the pixel region in the horizontal pixel line direction, for example, based on the first control information output from the first processing unit 25 and outputs the pixel data in the second pixel region 13. The direction and size in which the second processing unit 26 clips a part of the first pixel region are arbitrary.

The clipping driving unit 4 generates a driving signal for the pixel array unit 2 to perform the first stage of pixel clipping in the next frame based on the second control information output from the first processing unit 25, and supplies the driving signal to the pixel array unit 2.

The storage unit 24 stores at least one of a condition for the second stage of clipping in the signal processing unit 3 and a condition for detecting and tracking a moving object in the first pixel region 12. The storage unit 24 may be configured of a register circuit or a semiconductor memory. More specifically, the storage unit 24 may store information on whether to detect and track a moving object, information on the initial coordinates and size of the second pixel region 13, and information for detecting the moving object in the first pixel region 12.

The signal processing chip 21 performs various types of signal processing on the pixel data in the second pixel region 13 output from the imaging device 1. The specific content of the signal processing is not limited, but includes, for example, brightness adjustment, noise reduction processing, and the like.

The external control unit 22 performs various controls on the imaging device 1. The specific content of the control performed by the external control unit 22 is not limited, but includes, for example, at least one of the setting of whether or not to track the moving object, the setting related to the tracking detection frame set in the first pixel region 12, and the setting related to detection of the moving object.

The imaging device 1 determines whether or not to track the moving object based on the setting of whether or not to track the moving object by the external control unit 22. The setting related to the tracking detection frame may include at least one of the coordinates of the initial position of the tracking detection frame and the size (width and height) of the tracking detection frame. The setting related to the detection of the moving object may include at least one of the time from when the moving object is absent in the first pixel region 12 until it is determined that it has disappeared, the setting of a color filter for binarizing the moving object, the setting of a threshold value for binarization, and the setting of a threshold value of the size of the moving object. In the present specification, the setting information related to the detection of a moving object may be referred to as a moving object detection parameter. The reason for binarizing the moving object is to detect and track the moving object at high speed, and the process of binarizing the moving object is performed using a color filter corresponding to the color of the moving object. The binarization process is not essential. For example, the color filter described above may be used for generating image data for facilitating detection and tracking of moving objects. In this case, the threshold value is set when the above-mentioned image data is generated.

The external control unit 22 inputs control information and setting information for performing various controls on the imaging device 1 to the imaging device 1. These pieces of control information and setting information are stored in the storage unit 24 in the imaging device 1. Each unit in the imaging device 1, for example, the first processing unit 25 and the second processing unit 26, performs detection and tracking of a moving object based on the control information and the setting information from the external control unit 22 stored in the storage unit 24 and performs clipping of the second pixel region 13. As described above, since the control information and the setting information from the external control unit 22 are stored in the storage unit 24 and read out from each unit in the imaging device 1 at any time, the external control unit 22 does not need to input the control information and the setting information to the imaging device 1 in real time.

Since the pixel array unit 2 according to the present embodiment outputs only the pixel data in the first pixel region 12 designated by the clipping driving unit 4 at high resolution, the pixel data can be quickly output from the pixel array unit 2 and the power consumption can be reduced. Since the first pixel region 12 has a larger size than the second pixel region 13 which is the region of interest, it is possible to quickly detect and track a moving object in the first pixel region 12.

Figure 4:
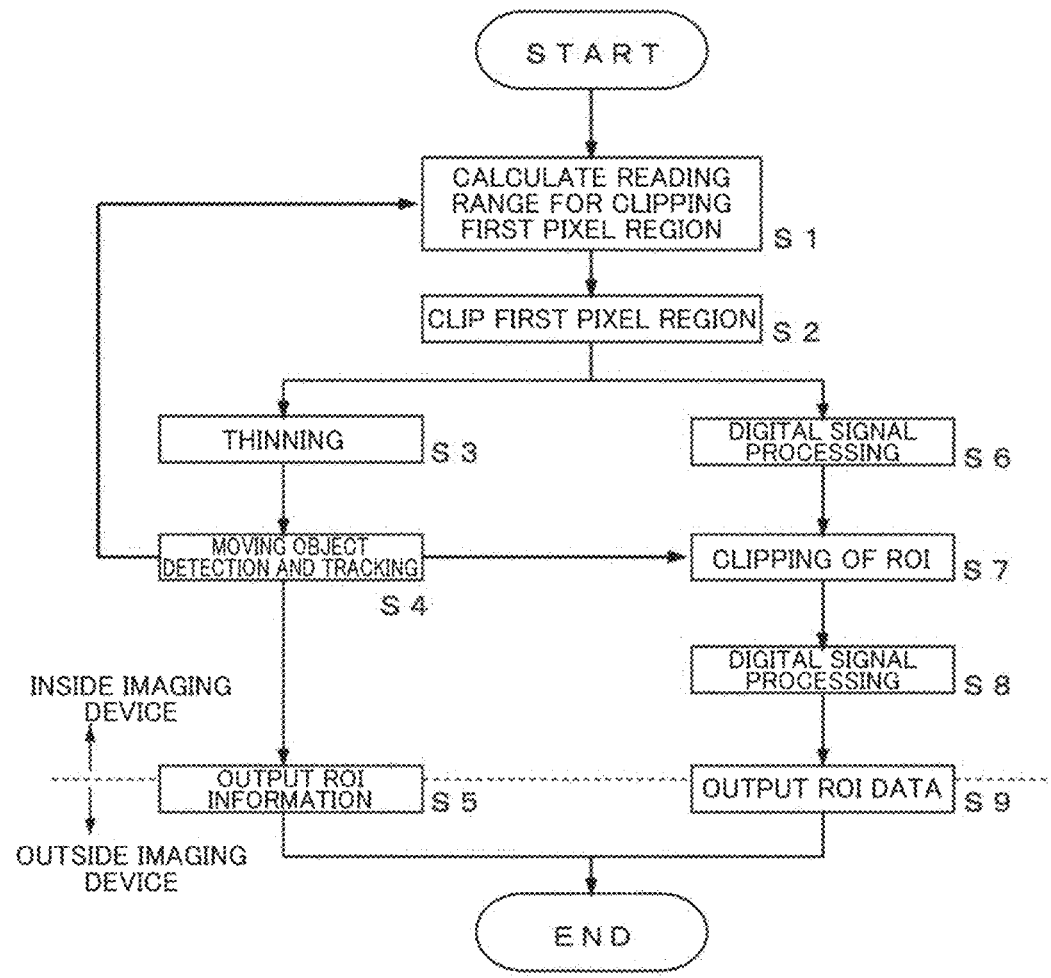
FIG. 4 is a flowchart showing a processing operation of the imaging device according to the first embodiment.

FIG. 4 is a flowchart showing the processing operation of the imaging device 1 according to the first embodiment. First, based on the first control information generated by the first processing unit 25, the reading range in the vertical line direction for clipping the first pixel region 12 from the effective pixel region 11 is calculated (step S1). The process of step S1 is performed, for example, by the first processing unit 25 or the clipping driving unit 4 of FIG. 3.

Next, the clipping driving unit 4 drives a part of the pixel circuits 2a in the pixel array unit 2 based on the processing result in step S1. As a result, the pixel data in the first pixel region 12 clipped from the effective pixel region 11 is output from the pixel array unit 2 at high resolution (step S2). Since the first pixel region 12 is a part of the pixel region in the effective pixel region 11, the pixel data can be output at high speed even if the pixel data is output at high resolution.

The pixel data in the first pixel region 12 is sent to the first processing unit 25 and the second processing unit 26 in the signal processing unit 3. The first processing unit 25 performs thinning of the pixel data in the first pixel region 12 (step S3). Next, a tracking detection frame is set in the first pixel region 12 after the pixel data is thinned out, and the search is continued until a moving object enters the tracking detection frame (step S4). In the process of step S4, the first control information for clipping the second pixel region 13 and the second control information for clipping the first pixel region 12 of the next frame are generated.

The reason for performing the pixel data thinning process in step S3 is that high-resolution image data is not required for detecting whether or not a moving object is present in the first pixel region 12, and the moving object can be detected quickly by performing the moving object detection process after the resolution is decreased. However, as described above, if the processing performance of the first processing unit 25 is high, the thinning process may be omitted.

When a moving object is detected in step S4, ROI information including the position where the moving object is detected is output (step S5). The process of step S5 may be omitted.

On the other hand, predetermined digital signal processing is performed on the pixel data in the first pixel region 12 output in step S2 (step S6). The specific content of the predetermined digital signal processing is arbitrary, but noise reduction processing, brightness adjustment, and the like may be performed, for example.

Next, based on the first control information generated in step S4, the pixel data in the second pixel region 13 obtained by clipping a part of the pixel region in the horizontal line direction from the first pixel region 12 is output at high resolution (step S7). Since the second pixel region 13 has a smaller size than the first pixel region 12, even if it is output at high resolution, it can be output without lowering the output rate.

Next, predetermined digital signal processing is performed on the pixel data in the second pixel region 13 (step S8). The specific content of the digital signal processing is not limited, but noise reduction processing or the like may be performed. The pixel data after the digital signal processing in step S8 is output from the imaging device 1.

Figure 5:
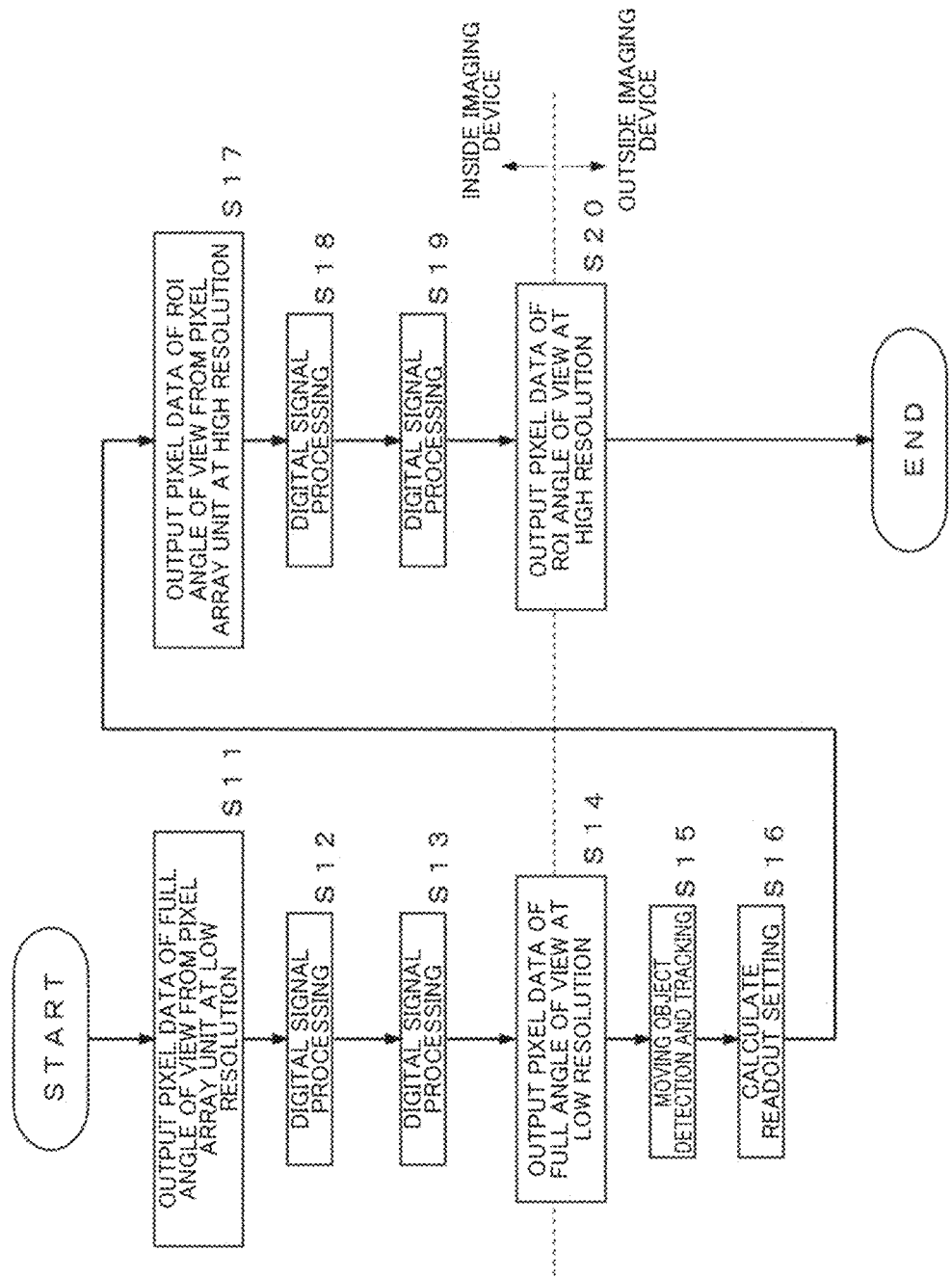
FIG. 5 is a flowchart showing the processing operation of an imaging device according to a first comparative example.

FIG. 5 is a flowchart showing the processing operation of an imaging device according to a first comparative example. The imaging device according to the first comparative example outputs pixel data (pixel data of full angle of view)

of the entire effective pixel region 11 at low resolution (step S11). Next, predetermined digital signal processing is performed on the pixel data output in step S11 (steps S12 and S13). The digital signal processing in steps S12 and S13 may be performed collectively in one step, or may be performed in three or more steps.

The imaging device according to the first comparative example outputs pixel data of full angle of view after digital signal processing (step S14). Next, using the pixel data of full angle of view output in step S14, a moving object is detected and tracked by a signal processing chip separate from the imaging device (step S15). Based on the processing result in step S15, a calculation for reading and setting the region of interest is performed (step S16).

Next, based on the calculation result in step S16, the pixel data in the region of interest is output at high resolution from the pixel array unit (step S17). Next, predetermined digital signal processing is performed on the pixel data output in step S17 (steps S18 and S19).

The imaging device according to the first comparative example outputs pixel data of the ROI angle of view after digital signal processing (step S20).

In the first comparative example of FIG. 5, pixel data of full angle of view is output from the imaging device, and moving object detection and tracking processing is performed by a signal processing chip separate from the imaging device. Thus, power consumption is higher than that of the present embodiment and the time required for detecting and tracking a moving object also increases. Further, since the moving object detection and tracking result in the signal processing chip is returned to the imaging device and clipping of the region of interest is performed by the imaging device, the time required for clipping the region of interest is longer than that in the present embodiment.

Figure 6:
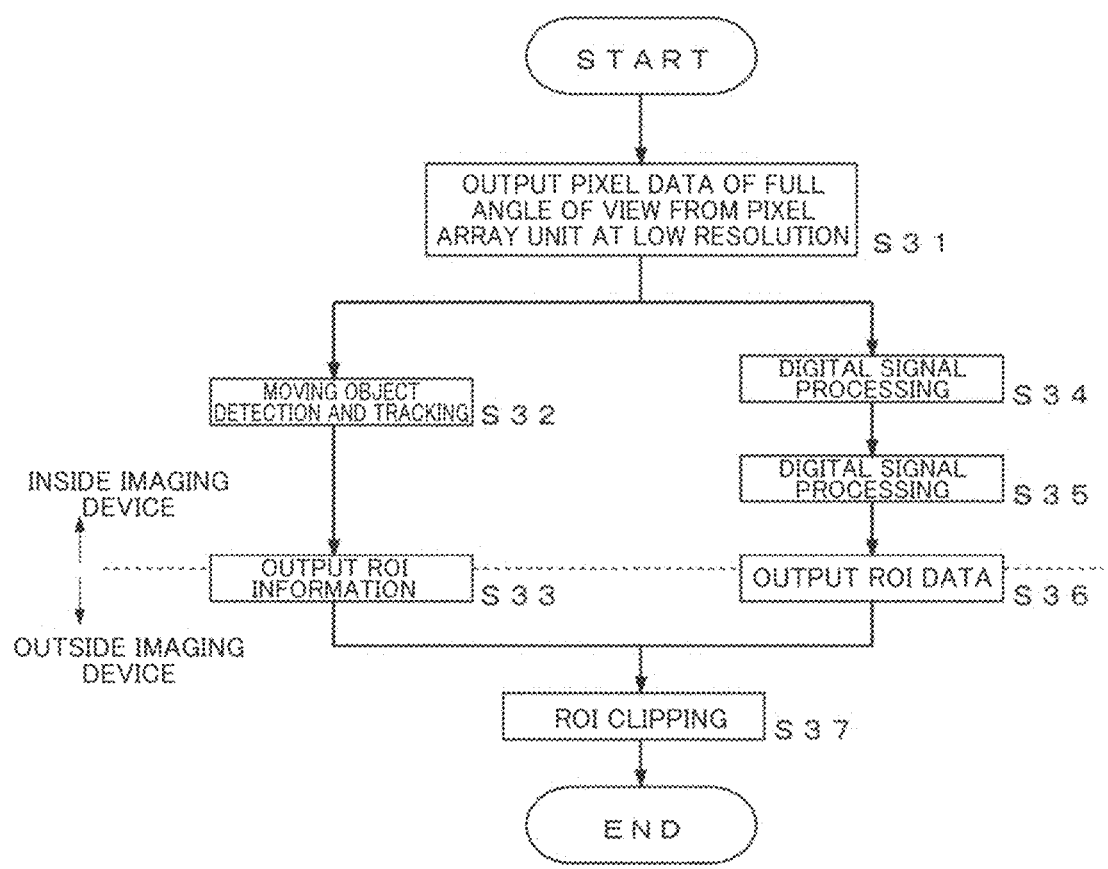
FIG. 6 is a flowchart showing the processing operation of an imaging device according to a second comparative example.

FIG. 6 is a flowchart showing the processing operation of an imaging device according to a second comparative example. The imaging device according to the second comparative example outputs pixel data of full angle of view in the effective pixel region from the pixel array unit at low resolution (step S31). A tracking detection frame is set for the pixel data of full angle of view, a moving object is detected, and when the moving object is detected, the tracking detection frame is moved according to the movement of the moving object to track the moving object (step S32). The imaging device according to the second comparative example outputs the moving object detection and tracking result in step S32 as ROI information (step S33).

In parallel with the processing of steps S31 to S33, predetermined digital signal processing is performed on the pixel data of full angle of view (steps S34 and S35). The imaging device outputs the pixel data of full angle of view after digital signal processing (step S36).

Next, based on the ROI information output in step S35, a part of the pixel data output in step S36 is clipped, and the pixel data in the region of interest is output at low resolution (step S37).

In the second comparative example of FIG. 6, the pixel data in the region of interest can be output only at low resolution. The reason why the second comparative example outputs the pixel data in the region of interest at low resolution is to secure the output rate. In addition, since pixel data of full angle of view is always output from the imaging device, power consumption increases.

As described above, as compared with the first comparative example and the second comparative example, the imaging device 1 according to the present embodiment outputs only the pixel data in the first pixel region 12 which is a part of the effective pixel region 11 from the pixel array unit 2 and performs detection and tracking of the moving object within the first pixel region 12, the moving object can be detected and tracked with high accuracy. Further, since the second pixel region 13 is clipped from the first pixel region 12 based on the moving object detection and tracking result and the pixel data in the second pixel region 13 is output at high resolution, the pixel data in the region of interest can be output at high resolution. According to the present embodiment, even if the moving object moves at high speed, the moving object can be tracked with good trackability, and the pixel data in the region of interest can be quickly output.

Figure 7:
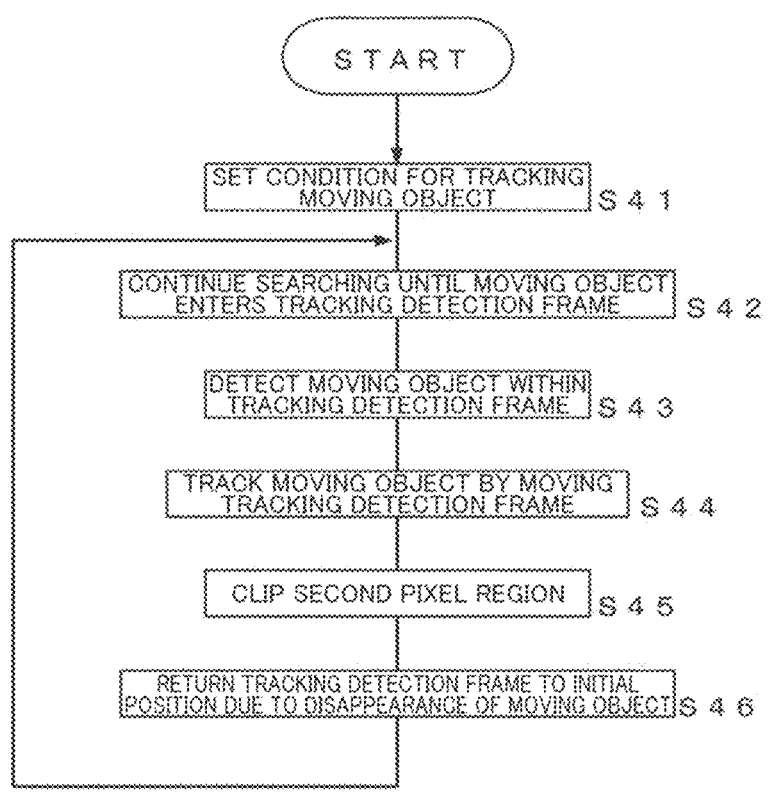
FIG. 7 is a flowchart showing a detailed processing operation of detection and tracking of a moving object performed by a first processing unit in the signal processing unit.
Figure 8:
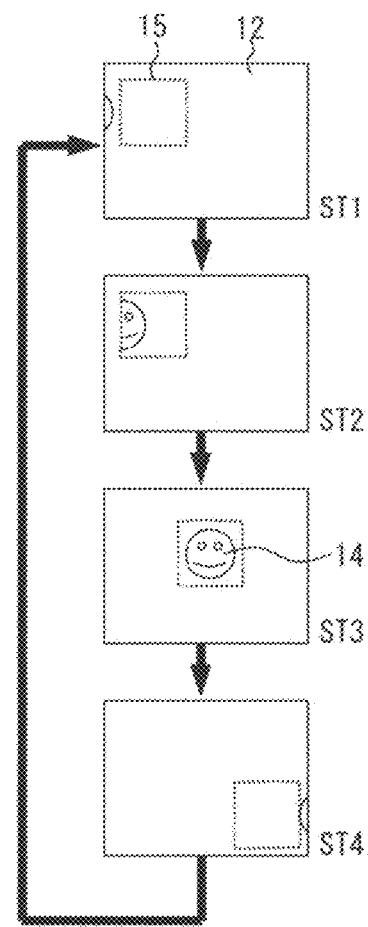
FIG. 8 is a diagram schematically showing a state in which a moving object is detected and tracked in a first pixel region.

FIG. 7 is a flowchart showing a detailed processing operation of moving object detection and tracking performed by the first processing unit 25 in the signal processing unit 3, and FIG. 8 schematically shows a state in which a moving object is detected and tracked in the first pixel region 12.

First, the conditions for tracking a moving object are set (step S41). Here, at least one of the color and size, which is a moving object detection condition, the initial condition of the tracking detection frame for tracking the moving object, the size of the first pixel region 12, and the size of the second pixel region 13 is set. The state ST1 in FIG. 8 shows an example in which the tracking detection frame 15 is initially set on the upper left side in the first pixel region 12.

Next, the search is continued until the moving object enters the tracking detection frame 15 (step S42). The state ST2 in FIG. 8 shows an example in which a moving object is detected in the tracking detection frame 15.

When a moving object is detected in the tracking detection frame 15 (step S43), as long as the moving object is moving in the first pixel region 12, the tracking detection frame 15 is moved according to the movement to track the moving object (step S44). The state ST3 of FIG. 8 shows an example in which when the moving object moves to the vicinity of the center in the first pixel region 12, the tracking detection frame 15 also follows and moves to the vicinity of the center in the first pixel region 12.

The second processing unit 26 clips the second pixel region 13 from the first pixel region 12 so as to include the moving object based on the moving object detection and tracking result of the first processing unit 25 to output high-resolution pixel data (step S45).

After that, when the moving object disappears from the first pixel region 12 as in the state ST4 of FIG. 8, the tracking detection frame 15 is returned to the initial position of the state ST1 of FIG. 8 after a disappearance determination time set in the storage unit 24 has elapsed (step S46), and the processing subsequent to step S42 is repeated.

As described above, in the imaging device 1 according to the first embodiment, since the pixel data in the effective pixel region 11 of the imaging device 1 is gradually clipped in two stages, the amount of pixel data read from the pixel array unit 2 can be reduced within a range where the moving object detection and tracking is not affected, and the power consumption can be reduced. Further, the second stage of pixel clipping can be performed based on the moving object detection and tracking result in the first pixel region 12 clipped in the first stage, and the image data in the second pixel region 13 which is the region of interest can be output at high resolution. Since the second pixel region 13 has a size that matches the moving object, it is not necessary to lower the output rate even if the image data is output at high resolution.

In the present embodiment, since the process of clipping the region of interest can be completed inside the imaging device 1, it is not necessary to perform the region-of-interest clipping process in the signal processing chip 21 provided separately from the imaging device 1, and the power consumption can be reduced and the trackability of the region of interest is improved.

The clipping of the first pixel region 12 performed when reading the pixel data from the pixel array unit 2 and the clipping of the second pixel region 13 performed based on the moving object detection and tracking result are performed in an arbitrary direction and an arbitrary size. Thus, the shape and size of the second pixel region 13, which is the region of interest, can be arbitrarily adjusted according to the type and size of the moving object.

Second Embodiment

Various modifications can be considered for the imaging device 1 described in the first embodiment.

For example, when reading pixel data from the pixel array unit 2, a shutter operation may be performed simultaneously on a plurality of pixel rows so that the number of shutter operations can be reduced to speed up pixel reading.

Further, when reading the pixel data of the first pixel region 12 from the pixel array unit 2, the first pixel region 12 may be a part of the pixel region in the vertical line direction in the effective pixel region 11, a part of the pixel region in the horizontal line direction in the effective pixel region 11, or a part of the pixel region in the horizontal line direction and the vertical line direction in the effective pixel region 11. If the moving range of the moving object is known in advance, when detecting and tracking a moving object having a small moving range, the size of the first pixel region 12 may be reduced so that the moving object can be detected and tracked with a small amount of signal processing.

In the first embodiment, an example in which only one tracking detection frame 15 is set in the first pixel region 12 has been described, but a plurality of tracking detection frames 15 may be set in the first pixel region 12 and a plurality of moving objects may be simultaneously detected and tracked using the plurality of tracking detection frames 15.

Further, in order to improve the resistance to erroneous loss of the moving object due to the disturbance such as the change in brightness, there may be a margin in time for determining that the moving object has disappeared from the tracking detection frame 15.

Further, when detecting a moving object, a feature parameter representing the features of the moving object may be added as needed. For example, the shape and speed of the moving object may be included in the feature parameters.

Further, when detecting a moving object, a process of calculating the center of gravity or a moment of the moving object is performed, but a specific process for detecting the moving object is not particularly limited.

Further, when there is a light source that blinks regularly or irregularly in the image captured by the imaging device 1, the brightness of the pixel data in the first pixel region 12 may change irregularly due to the influence of the light source, which may adversely affect the moving object detection and tracking process. Therefore, the timing of imaging by the imaging device 1 may be adjusted according to the cycle of the blinking light source so that the brightness of the captured image does not change due to the influence of the blinking light source.

As described above, the first processing unit 25 detects and tracks the moving object, but may predict the position of the moving object in the next frame based on vector information indicating the moving direction of the moving object. Based on the prediction result, the clipping position of the first pixel region 12 in the next frame may be set. Further, the first pixel region 12 may be set so that the predicted position of the moving object is located at the center of the first pixel region 12.

The output rate of the pixel data output from the imaging device 1 may be changed depending on whether or not the moving object has entered the tracking detection frame 15.

Figure 9:
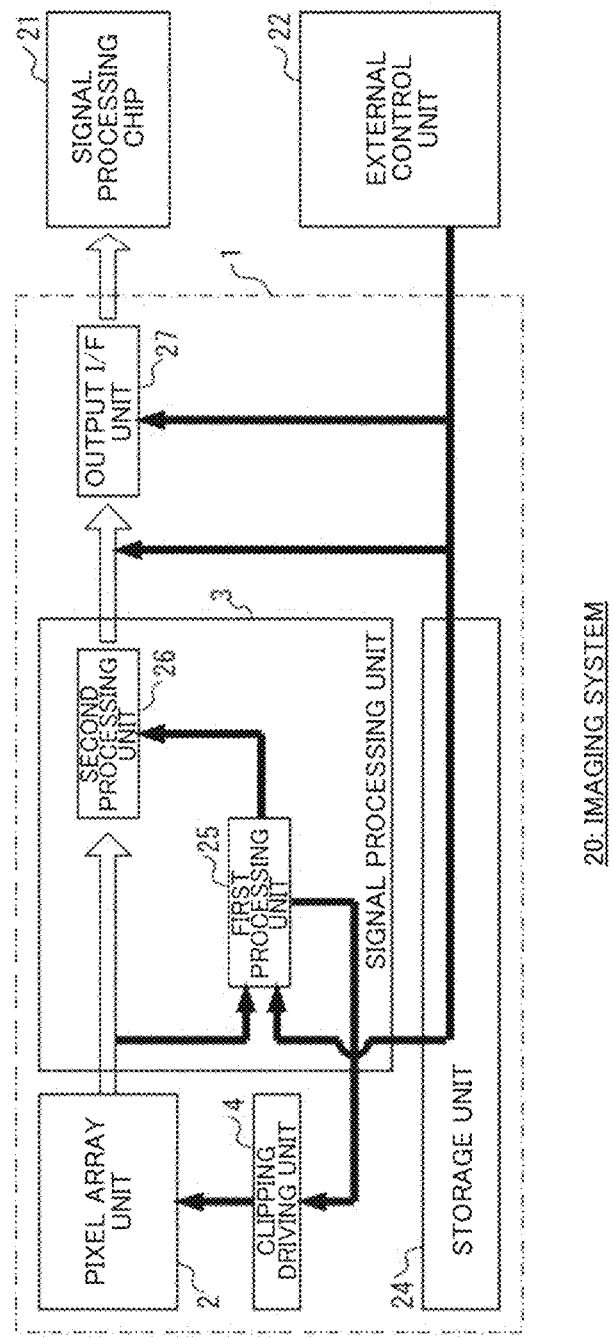
FIG. 9 is a block diagram of an imaging system including an imaging device according to a second embodiment.

FIG. 9 is a block diagram of the imaging system 20 including the imaging device 1 according to the second embodiment. The imaging device 1 of FIG. 9 is obtained by adding an output I/F unit 27 whose output rate can be adjusted to the imaging device 1 of FIG. 3. For example, when a moving object is detected by the first processing unit 25, the output I/F unit 27 outputs the pixel data in the second pixel region 13 at high resolution. On the other hand, when the moving object is not detected by the first processing unit 25, the output of the pixel data in the second pixel region 13 may be stopped, or the pixel data in the second pixel region 13 may be thinned out and output. In the latter case, the output rate will be lowered.

In this way, by improving at least a part of the imaging device 1 according to the first embodiment, it is possible to speed up the reading of pixel data, improve usability, improve tracking accuracy, and expand the moving object detection function. These improvements may be carried out in any combination.

Third Embodiment

A third embodiment makes it possible to update the moving object detection conditions from the outside of the imaging device 1.

Figure 10:
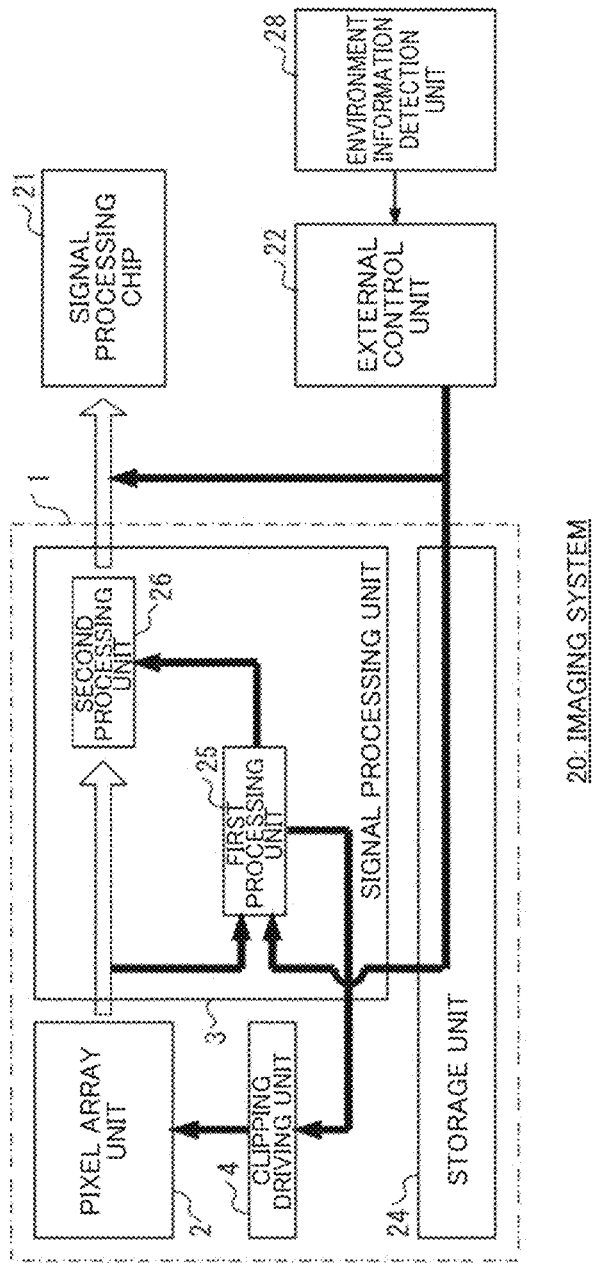
FIG. 10 is a block diagram of an imaging system including an imaging device according to a third embodiment.

FIG. 10 is a block diagram of an imaging system 20 including an imaging device 1 according to the third embodiment. The imaging system 20 of FIG. 10 includes an environment information detection unit 28 in the imaging device 1 of FIG. 3. The environment information detection unit 28 is connected to the external control unit 22, and updates the moving object detection parameters according to changes in the external environment such as temperature and humidity, changes in the brightness of the captured image, changes in the posture of the moving object, and the like. The environment information detection unit 28 may update the moving object detection parameter based on the detection signal of the brightness sensor or the like, or may update the moving object detection parameter based on the pixel data in the second pixel region 13 output from the imaging device 1. Alternatively, the environment information detection unit 28 may update the moving object detection parameter based on the result of machine learning performed based on the detection signal of the brightness sensor or the like.

Since the moving object detection and tracking process in the first processing unit 25 is performed at high speed, the moving object detection parameter may be updated at low speed by the environment information detection unit 28.

As described above, in the third embodiment, since the moving object detection parameters are updated according to the surrounding environment of the imaging device 1, the object can be detected and tracked according to the surrounding environment and the accuracy of object detection and tracking can be improved.

Fourth Embodiment

The fourth embodiment actively utilizes machine learning to automatically optimize the detection parameters for detecting a moving object.

Figure 11:
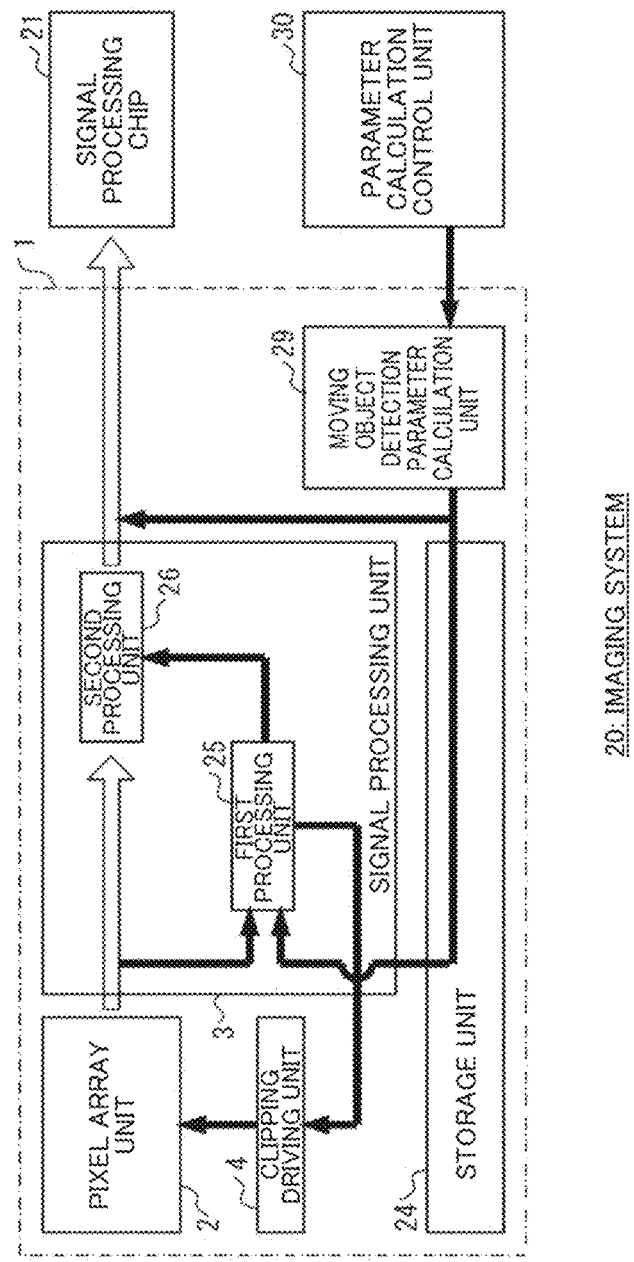
FIG. 11 is a block diagram of an imaging system including an imaging device according to a fourth embodiment.

FIG. 11 is a block diagram of an imaging system 20 including an imaging device 1 according to the fourth embodiment. In the imaging system 20 of FIG. 11, a moving object detection parameter calculation unit 29 is provided inside the imaging device 1 of FIG. 3, and a parameter calculation control unit 30 that provides information necessary for the moving object detection parameter calculation unit 29 is provided outside the imaging device 1.

The moving object detection parameter calculation unit 29 automatically detects the feature points of the moving object for detecting and tracking the moving object based on the pixel data in the second pixel region 13. The feature points are, for example, the color, size, shape, and the like of the moving object. The moving object may be detected by identification based on machine learning as well as identification based on image processing such as pattern matching. After performing identification based on image processing or machine learning, the feature points are converted to parameters that can be used for high-speed tracking, and the converted parameters are set.

The parameter calculation control unit 30 supplies information necessary for the moving object detection parameter calculation unit 29 to calculate the parameters. For example, when the moving object detection parameter calculation unit 29 performs machine learning, the parameter calculation control unit 30 supplies the input learning data, information necessary for identification, and the like.

As described above, since the imaging device 1 according to the fourth embodiment can automatically set the moving object detection conditions inside the imaging device 1, it is possible to improve the accuracy of moving object detection and tracking as the learning is repeated.

Fifth Embodiment

In the fifth embodiment, the imaging device 1 according to any one of the first to fourth embodiments described above can be used in the inspection process of the product manufactured in the manufacturing factory.

Figure 12:
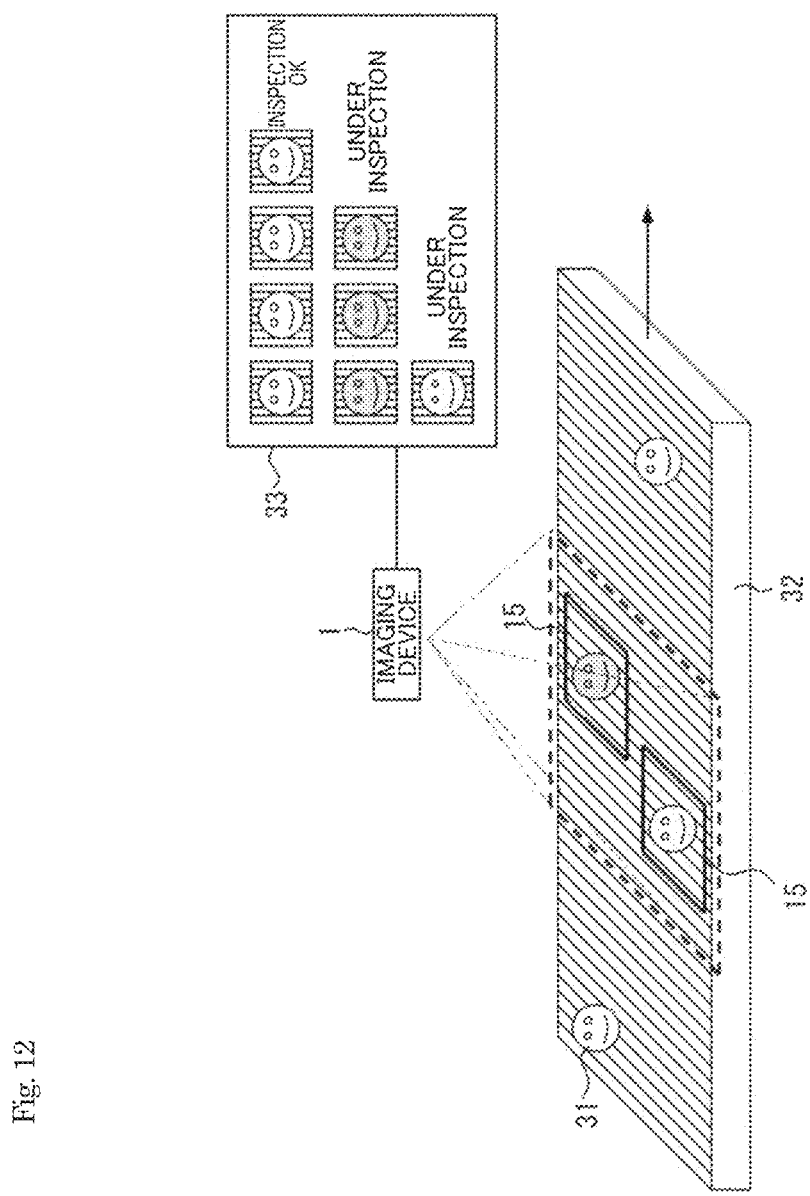
FIG. 12 is a diagram showing an example in which the imaging device 1 according to the first to fourth embodiments is arranged in the vicinity of a belt conveyor that conveys an inspection target object.

FIG. 12 shows an example in which the imaging device 1 according to the first to fourth embodiments is arranged in the vicinity of a belt conveyor 32 that conveys an inspection target object 31. In the example of FIG. 12, the belt conveyor 32 moves from left to right, and a plurality of inspection target objects 31 are placed on the belt conveyor 32. It is assumed that the inspection target object 31 can be identified as a non-defective product or a defective product based on its appearance. The imaging device 1 is arranged above the belt conveyor 32 so that a plurality of inspection target objects 31 on the belt conveyor 32 can be photographed. The imaging device 1 may be built in the camera.

As shown in FIG. 12, a display device 33 is connected to the imaging device 1, an image of the region of interest output from the imaging device 1 is displayed on the display device 33, and the inspection result and the inspection state are displayed.

Figure 13:
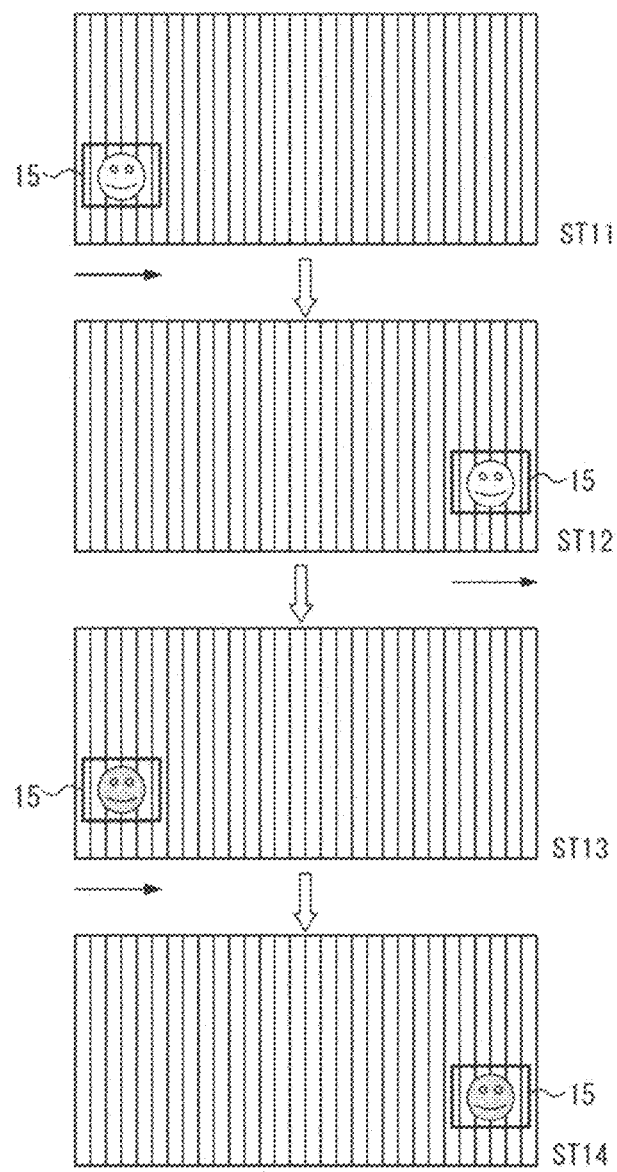
FIG. 13 is a diagram schematically showing a state in which an imaging device detects and tracks an inspection target object.

FIG. 13 is a diagram schematically showing a state in which the imaging device 1 detects and tracks the inspection target object 31. The state ST11 in FIG. 13 shows an example in which the tracking detection frame 15 is set at the left end of the belt conveyor 32. Assuming that the inspection target object 31 is detected in the tracking detection frame 15, the inspection target object 31 moves with the movement of the belt conveyor 32, but the tracking detection frame 15 also moves with the movement of the inspection target object 31 (state ST12). Since the position of the imaging device 1 is fixed, the inspection target object 31 disappears from the tracking detection frame 15. As a result, the tracking detection frame 15 returns to the initial position again as in the states ST13 and ST14, and detects and tracks the next inspection target object 31.

The pixel data in the second pixel region 13 output from the imaging device 1 is displayed on the display device 33, for example, as shown in FIG. 12. In the example of FIG. 12, the inspection target object 31 for which the inspection is OK and the inspection target object 31 under inspection are displayed separately.

As described above, in the fifth embodiment, the quality of each inspection target object 31 can be determined without stopping the belt conveyor 32 while the inspection target object 31 is being conveyed by the belt conveyor 32. Further, even if the position of the inspection target object 31 placed on the belt conveyor 32 is slightly displaced, the inspection target object 31 can be detected and tracked. Further, since the pixel data in the second pixel region 13 output from the imaging device 1 has high resolution, the appearance of the inspection target object 31 can be clearly projected when displayed on the display screen of the display device 33, which makes it easier to determine the quality by visual inspection or image analysis.

Sixth Embodiment

When the imaging device 1 according to any one of the first to fourth embodiments described above is used in an inspection process of an inspection target object 31 manufactured in a manufacturing factory, it is possible to give features to an imaging method, an image correction process, sorting of the inspection target object 31, tracking of the inspection target object 31, and the like.

FIG. 14A is a diagram showing an example in which a detected moving object is imaged a plurality of times under different imaging conditions. For example, if the inspection target object 31 is detected while the inspection target object 31 is being conveyed by the belt conveyor 32, the inspection target object 31 is tracked. However, during that time, imaging is repeated a plurality of times while changing the imaging conditions and the pixel data in the second pixel region 13 is output for each imaging condition. The imaging condition may be, for example, a focus condition or an exposure condition.

Figure 14B:
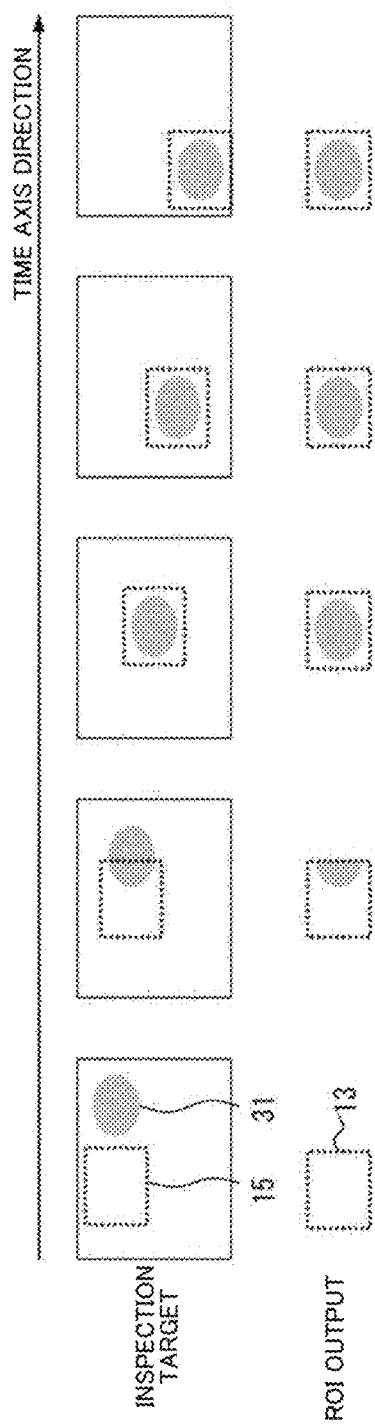
FIG. 14B is a diagram showing an example of correcting pixel data in a second pixel region output from an imaging device.

FIG. 14B is a diagram showing an example of correcting the pixel data in the second pixel region 13 output from the imaging device 1.

When the inspection target object 31 is conveyed by the belt conveyor 32, displacement of the inspection target object 31, uneven brightness, blurring of the contour edge, and the like occur due to vibration. Therefore, when the inspection target object 31 is detected by the imaging device 1, the inspection target object 31 is tracked, and the pixel data in the second pixel region 13 output from the imaging device 1 during tracking is integrated and averaged. By doing so, it is possible to sharpen the contour edge of the pixel data in the second pixel region 13 and suppress uneven brightness.

FIG. 14C sorts the inspection target object 31 using the imaging device 1. In the example of FIG. 14C, it is assumed that the inspection target object 31 is attached with label information 16 for sorting. Further, the belt conveyor 32 is branched into a plurality of paths so that the conveying destination of the inspection target object 31 can be switched. When the imaging device 1 detects the inspection target object 31, the label information 16 of the inspection target object 31 is recognized. Then, the conveying destination of the inspection target object 31 is switched according to the recognized label information 16.

Figure 14D:
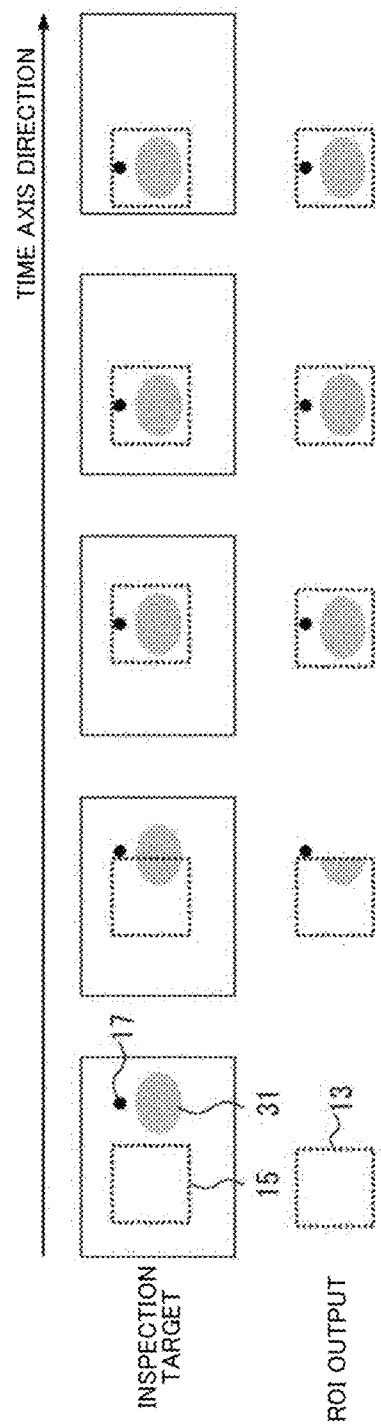
FIG. 14D is a diagram showing an example in which a marker for detecting and tracking an inspection target portion is provided.

FIG. 14D shows an example in which a marker 17 for detecting and tracking the inspection target portion is provided. In the example of FIG. 14D, the marker 17 is provided in the vicinity of each inspection target object 31 on the belt conveyor 32. The imaging device 1 detects the center of gravity in the tracking detection frame 15, and moves the tracking detection frame 15 so that the center of gravity is located at the center in the tracking detection frame 15.

As described above, in the sixth embodiment, using the imaging device 1 according to any one of the first to fourth embodiments, the region of interest can be imaged a plurality of times by changing the imaging conditions, the pixel data in the region of interest can be corrected, the inspection target objects 31 that has been detected and tracked can be sorted, and the tracking of the inspection target object 31 can be performed accurately.

Seventh Embodiment

In a seventh embodiment, an electronic camera shake correction process is performed using the imaging device 1 according to any one of the first to fourth embodiments.

Since the conventional electronic camera shake correction process is performed by the signal processing chip 21 that performs signal processing on the pixel data output from the imaging device 1, there is a problem that a delay always occurs.

Figure 15:
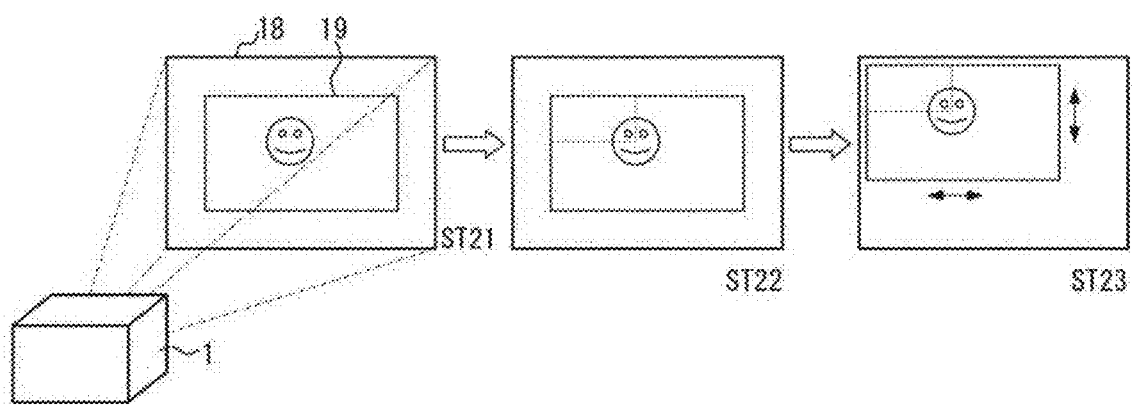
FIG. 15 is a diagram illustrating a camera shake correction process according to a seventh embodiment.

FIG. 15 is a diagram illustrating the camera shake correction process according to the seventh embodiment. Even if a detection target object for detecting vibration is set as a fixed point (fixed object) (state ST21) and vibration occurs (state ST22), the position of the output angle of view 19 is changed so that the fixed object is always at a fixed position within the output angle of view 19 which is a part of the full angle of view 18 (state ST23). In the state ST23, even if vibration occurs, the relative coordinates of the fixed object with respect to the output angle of view do not change, and an electronic camera shake correction process can be performed.

In the imaging device 1 according to any one of the first to fourth embodiments, the first processing unit 25 in the signal processing unit 3 detects and tracks the inspection target object 31, so that the deviation from the original fixed position of the inspection target object 31 can be detected in real time. By adjusting the output angle of view 19 by this deviation, an electronic camera shake correction process can be realized.

(Example of Application to Electronic Equipment)

Figure 16:
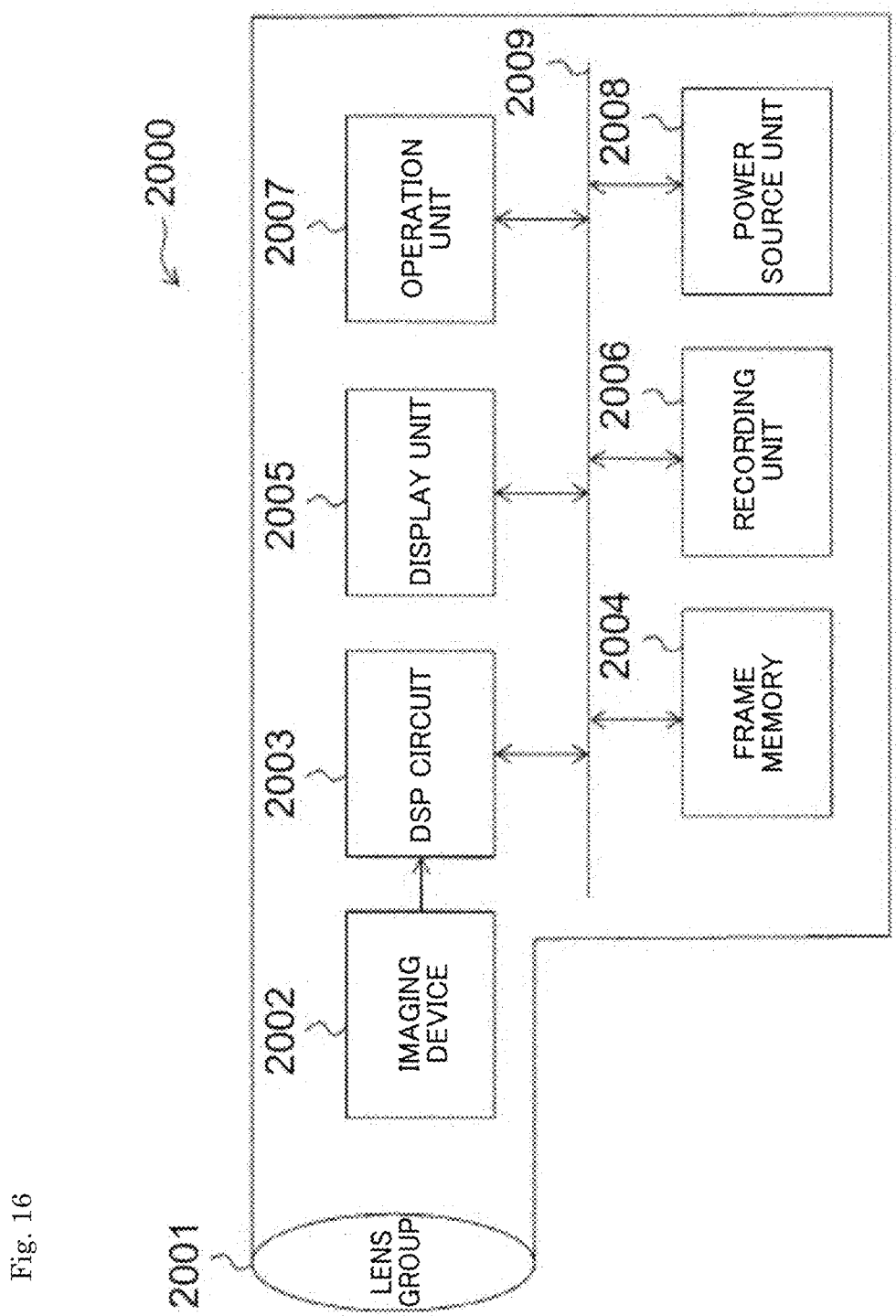
FIG. 16 is a block diagram illustrating a configuration example of a camera as an electronic equipment to which the present technology is applied.

FIG. 16 is a block diagram illustrating a configuration example of a camera 2000 as an electronic device to which the present technology is applied.

The camera 2000 includes an optical unit 2001 including a lens group and the like, an imaging device (imaging device) 2002 to which the aforementioned imaging device 100 or the like (hereinafter, referred to as an imaging device 100 or the like) is applied, and a digital signal processor (DSP) circuit 2003 that is a camera signal processing circuit. Additionally, the camera 2000 also includes a frame memory 2004, a display unit 2005, a recording unit 2006, an operation unit 2007, and a power source unit 2008. The DSP circuit 2003, the frame memory 2004, the display unit 2005, the recording unit 2006, the operation unit 2007, and the power source unit 2008 are connected to each other via a bus line 2009.

The optical unit 2001 captures incident light (image light) from a subject and forms an image on an imaging surface of the imaging device 2002. The imaging device 2002 converts the amount of incident light formed on the imaging surface by the optical unit 2001 into an electric signal in units of pixels and outputs the electric signal as a pixel signal.

The display unit 2005 is constituted by a panel-type display device such as a liquid crystal panel or an organic EL panel, for example, and displays a video or a stationary image captured by the imaging device 2002. The recording unit 2006 records the video or the stationary image captured by the imaging device 2002 in a recording medium such as a hard disk or a semiconductor memory.

The operation unit 2007 issues operation commands for various functions that the camera 2000 has in response to user operations. The power source unit 2008 appropriately supplies various power supplies serving as operation power supplies for the DSP circuit 2003, the frame memory 2004, the display unit 2005, the recording unit 2006, and the operation unit 2007 to these supply targets.

As described above, acquisition of a satisfactory image can be expected by using the above-described imaging device 100 or the like as the imaging device 2002.

Example of Application to Moving Body

The technique (the present technique) according to the present disclosure can be applied to various products. For example, the technology according to the present disclosure may be realized as an apparatus mounted on any type of moving body such as an automobile, an electric vehicle, a hybrid electric vehicle, a motorcycle, a bicycle, a personal mobility, an airplane, a drone, a ship, and a robot.

Figure 17:
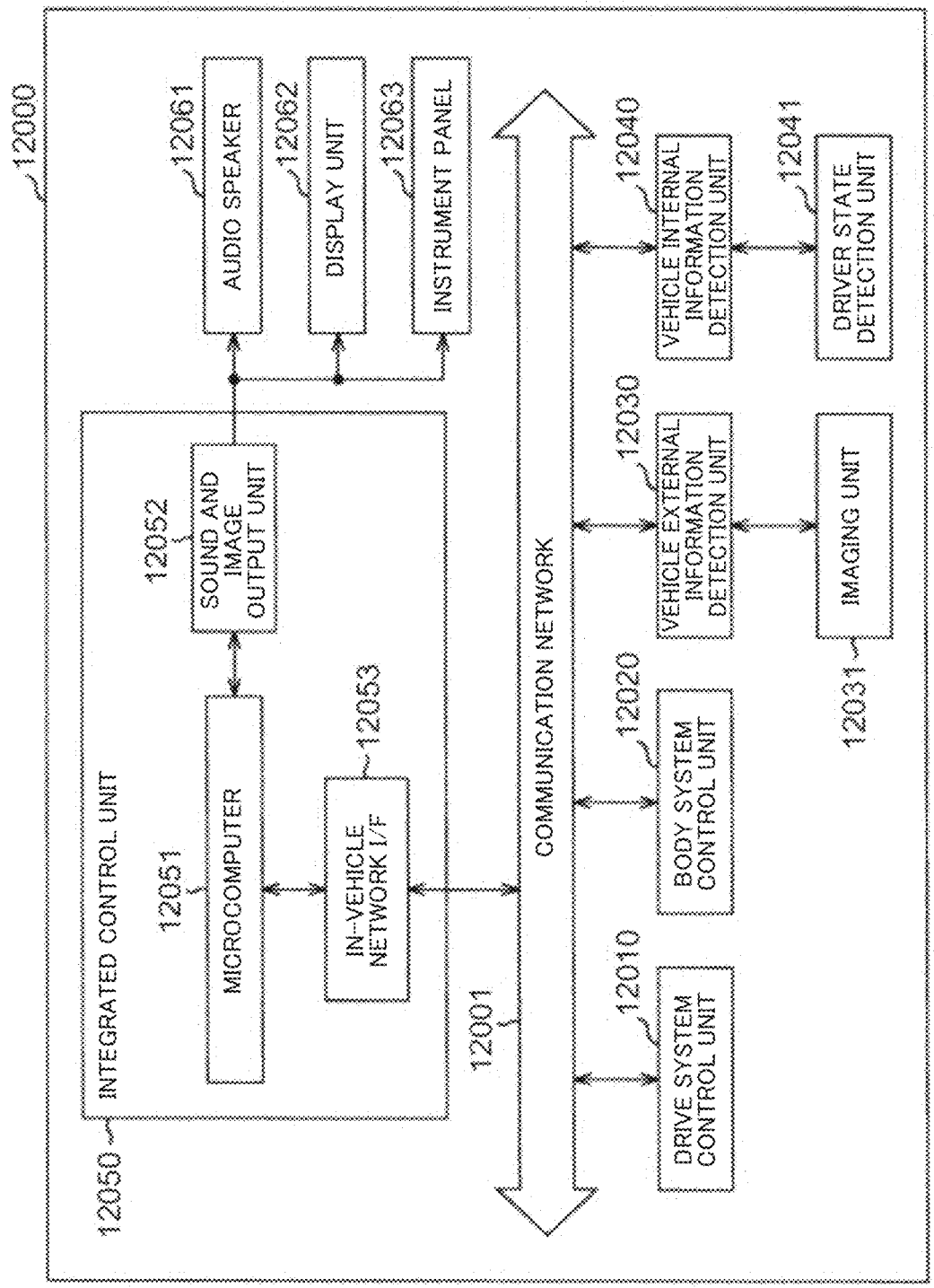
FIG. 17 is a block diagram illustrating a schematic configuration example of a vehicle control system that is an example of a moving body control system.

FIG. 17 is a block diagram showing a schematic configuration example of a vehicle control system, which is an example of a moving object control system to which the technique according to the present disclosure can be applied.

A vehicle control system 12000 includes a plurality of electronic control units connected to each other via a communication network 12001. In the example shown in FIG. 17, the vehicle control system 12000 includes a drive system control unit 12010, a body system control unit 12020, a vehicle external information detection unit 12030, a vehicle internal information detection unit 12040, and an integrated control unit 12050. A microcomputer 12051, a sound and image output unit 12052, and an in-vehicle network interface (I/F) 12053 are illustrated as a functional configuration of the integrated control unit 12050.

The drive system control unit 12010 controls an operation of a device related to a drive system of a vehicle according to various programs. For example, the drive system control unit 12010 functions as a control device for a driving force generator for generating a driving force of a vehicle such as an internal combustion engine or a driving motor, a driving force transmission mechanism for transmitting a driving force to wheels, a steering mechanism for adjusting a turning angle of a vehicle, a braking device that generates a braking force of a vehicle, and the like.

The body system control unit 12020 controls operations of various devices equipped in a vehicle body in accordance with various programs. For example, the body system control unit 12020 functions as a control device of a keyless entry system, a smart key system, a power window device, or various lamps such as a head lamp, a back lamp, a brake lamp, a turn signal, or a fog lamp. In this case, radio waves transmitted from a portable device that substitutes for a key or signals of various switches can be input to the body system control unit 12020. The body system control unit 12020 receives inputs of these radio waves or signals and controls a door lock device, a power window device, a lamp, and the like of the vehicle.

The vehicle external information detection unit 12030 detects information on the outside of the vehicle having the vehicle control system 12000 mounted thereon. For example, an imaging unit 12031 is connected to the vehicle external information detection unit 12030. The vehicle external information detection unit 12030 causes the imaging unit 12031 to capture an image outside the vehicle and receives the captured image. The vehicle external information detection unit 12030 may perform object detection processing or distance detection processing for people, cars, obstacles, signs, and letters on a road on the basis of the received image.

The imaging unit 12031 is an optical sensor that receives light and outputs an electrical signal according to the amount of received light. The imaging unit 12031 can also output the electrical signal as an image and ranging information. In addition, light received by the imaging unit 12031 may be visible light, or may be invisible light such as infrared light.

The vehicle internal information detection unit 12040 detects information inside the vehicle. For example, a driver state detection unit 12041 that detects a state of a driver is connected to the vehicle internal information detection unit 12040. The driver state detection unit 12041 includes, for example, a camera that captures an image of the driver, and the vehicle internal information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generation device, the steering mechanism, or the braking device on the basis of information inside and outside the vehicle acquired by the vehicle external information detection unit 12030 or the vehicle internal information detection unit 12040, and output a control command to the drive system control unit 12010. For example, the microcomputer 12051 can perform coordinated control for the purpose of realizing a function of an advanced driver assistance system (ADAS) including vehicle collision avoidance, shock alleviation, following travel based on an inter-vehicle distance, cruise control, vehicle collision warning, vehicle lane departure warning, or the like.

Further, the microcomputer 12051 can perform cooperative control for the purpose of automated driving or the like in which autonomous travel is performed without depending on operations of the driver by controlling the driving force generator, the steering mechanism, the braking device, and the like on the basis of information regarding the surroundings of the vehicle acquired by the vehicle external information detection unit 12030 or the vehicle internal information detection unit 12040.

In addition, the microcomputer 12051 can output a control command to the body system control unit 12020 based on the information outside the vehicle acquired by the vehicle external information detection unit 12030. For example, the microcomputer 12051 can perform cooperative control for the purpose of preventing glare, such as switching from a high beam to a low beam, by controlling the headlamp according to the position of a preceding vehicle or an oncoming vehicle detected by the vehicle external information detection unit 12030.

The sound and image output unit 12052 transmits an output signal of at least one of audio and an image to an output device capable of visually or audibly notifying a passenger or the outside of the vehicle of information. In an example shown in FIG. 17, an audio speaker 12061, a display unit 12062, and an instrument panel 12063 are exemplified as output devices. The display unit 12062 may include, for example, at least one of an onboard display and a head-up display.

Figure 18:
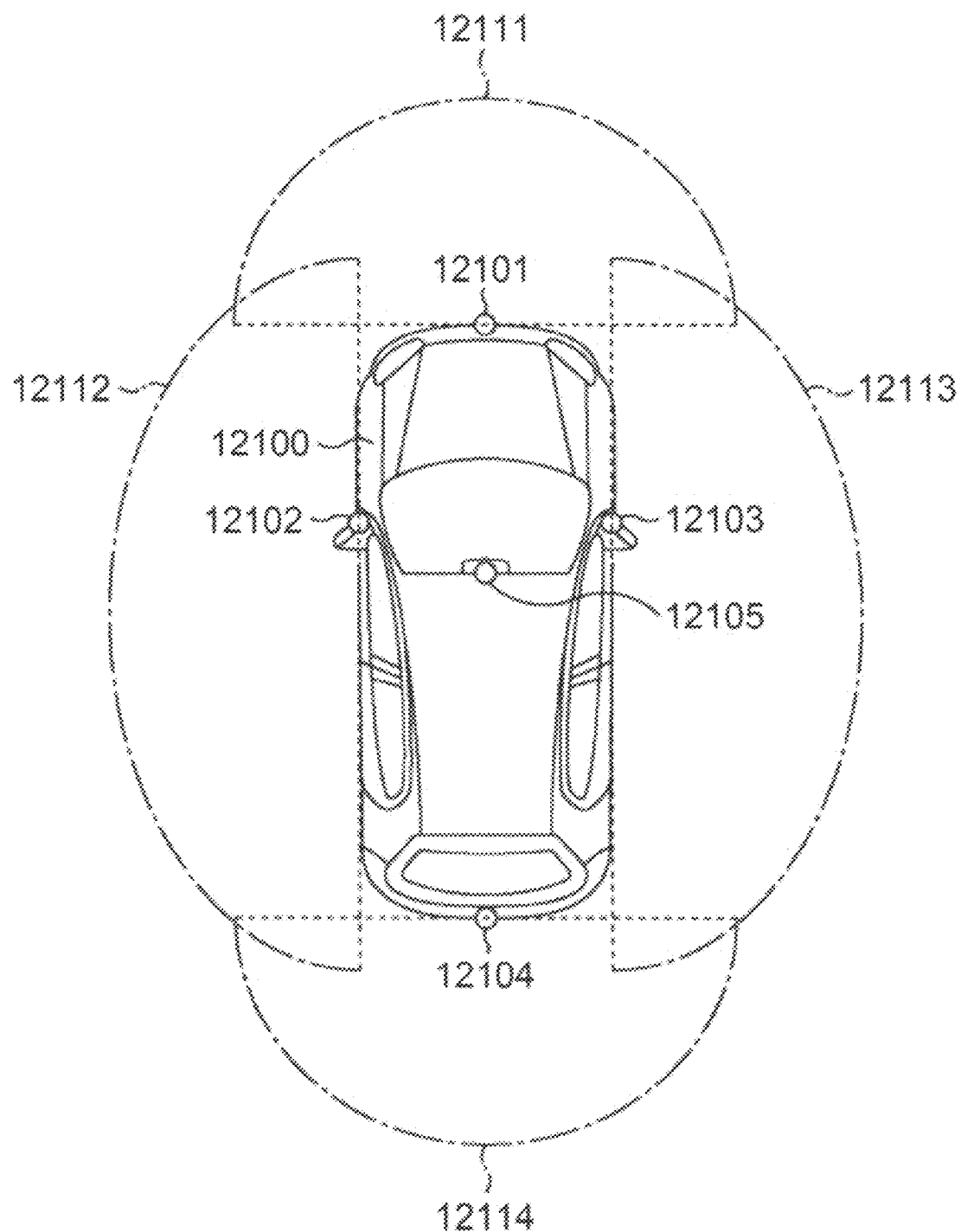
FIG. 18 is a diagram illustrating an example of an installation position of an imaging unit.

FIG. 18 is a diagram illustrating an example of an installation position of the imaging unit 12031.

In FIG. 18, imaging units 12101, 12102, 12103, 12104, and 12105 are included as the imaging unit 12031.

The imaging units 12101, 12102, 12103, 12104, and 12105 are provided at, for example, positions of a front nose, side mirrors, a rear bumper, a back door, an upper portion of a vehicle interior front windshield, and the like of a vehicle 12100. The imaging unit 12101 provided on a front nose and the imaging unit 12105 provided in an upper portion of the vehicle interior front windshield mainly acquire images in front of the vehicle 12100. The imaging units 12102 and 12103 provided on the side mirrors mainly acquire images on the lateral side of the vehicle 12100. The imaging unit 12104 provided on the rear bumper or the back door mainly acquires images in the rear of the vehicle 12100. The imaging unit 12105 provided on the upper portion of the vehicle interior front windshield is used to mainly detect front vehicles, pedestrians, obstacles, traffic signals, traffic signs, lanes, or the like.

Also, FIG. 18 shows an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, and an imaging range 12114 indicates an imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function for acquiring distance information. For example, at least one of the imaging units 12101 to 12104 may be a stereo camera constituted by a plurality of imaging elements or may be an imaging element having pixels for phase difference detection.

For example, the microcomputer 12051 can extract a 3-dimensional object traveling at a predetermined speed (for example, 0 or more km/h) in substantially the same direction as the vehicle 12100 particularly in a 3-dimensional object closest to a travel road of the vehicle 12100 as a front vehicle by obtaining a distance to each 3-dimensional object in the imaging ranges 12111 to 12114 and a change (a relative speed to the vehicle 12100) in the distance over time based on distance information obtained from the imaging units 12101 to 12104. Further, the microcomputer 12051 can set an inter-vehicle distance which should be guaranteed in advance in front of a front vehicle and can perform automated brake control (also including following stop control) or automated acceleration control (also including following start control). In this way, it is possible to perform cooperated control in order to perform automated driving or the like in which a vehicle autonomously travels irrespective of a manipulation of a driver.

For example, the microcomputer 12051 can classify and extract 3-dimensional data regarding 3-dimensional objects into other 3-dimensional objects such as a two-wheeled vehicle, a normal vehicle, a large vehicle, a pedestrian, and an electric pole based on distance information obtained from the imaging units 12101 to 12104 and can use the other 3-dimensional objects to perform automated avoidance of obstacles. For example, the microcomputer 12051 identifies surrounding obstacles of the vehicle 12100 as obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than the set value and there is a possibility of collision, an alarm is output to the driver through the audio speaker 12061 and the display unit 12062, forced deceleration and avoidance steering are performed through the drive system control unit 12010, and thus it is possible to perform driving support for collision avoidance.

At least one of the imaging units 12101 to 12104 may be an infrared camera that detects infrared rays. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating the outline of the object and it is determined whether the object is a pedestrian. When the microcomputer 12051 determines that there is a pedestrian in the captured images of the imaging units 12101 to 12104, and the pedestrian is recognized, the sound and image output unit 12052 controls the display unit 12062 so that the recognized pedestrian is superimposed and displayed with a square contour line for emphasis. In addition, the sound and image output unit 12052 may control the display unit 12062 so that an icon indicating a pedestrian or the like is displayed at a desired position.

The example of the vehicle control system to which the technology according to the present disclosure can be applied has been described above. The technology of the present disclosure can be applied to the imaging unit 12031 and the like in the above-described configuration. Specifically, the imaging device 100 and the like illustrated in FIG. 1 and the like can be applied to the imaging unit 12031. It is possible to expect excellent operations of the vehicle control system by applying the technology according to the present disclosure to the imaging unit 12031.

The present technique can also take on the following configurations.

(1) An imaging device including: a pixel array unit that has a plurality of pixel circuits and can clip a first pixel region which is a part of an effective pixel region and output pixel data in the first pixel region; and a signal processing unit that detects and tracks a moving object in the first pixel region based on the pixel data output from the pixel array unit in the first pixel region, clips a second pixel region which is a part of the first pixel region, and outputs pixel data in the second pixel region.

(2) The imaging device according to (1), wherein the signal processing unit clips the second pixel region from the first pixel region without degrading a pixel resolution.

(3) The imaging device according to (1) or (2), wherein when the moving object is present in the first pixel region, the signal processing unit clips the second pixel region so as to follow a position of the moving object.

(4) The imaging device according to any one of (1) to (3), wherein the signal processing unit detects and tracks the moving object based on the pixel data in the first pixel region.

(5) The imaging device according to any one of (1) to (4), wherein the signal processing unit outputs a signal indicating a range in which the pixel array unit clips from the effective pixel region in a next frame based on the position of the moving object in the first pixel region, and the pixel array unit clips the first pixel region based on the signal output from the signal processing unit.

(6) The imaging device according to (5), wherein the signal processing unit includes: a first processing unit that detects and tracks the moving object based on the pixel data in the first pixel region, and a second processing unit that clips the second pixel region from the first pixel region based on a signal indicating a result of detecting and tracking the moving object obtained by the first processing unit.

(7) The imaging device according to (6), further including: a clipping driving unit that controls the first pixel region output by the pixel array unit for each frame, wherein the first processing unit outputs first control information indicating a range to be clipped from the first pixel region to the second processing unit and outputs second control information indicating the range of the first pixel region to be clipped from the effective pixel region to the clipping driving unit.

(8) The imaging device according to (7), wherein the first processing unit sets a tracking detection frame in the first pixel region, and when the moving object is detected in the tracking detection frame, performs a process of moving the tracking detection frame according to the position of the moving object in the first pixel region, and outputs the first control information and the second control information.

(9) The imaging device according to any one of (1) to (8), further including: a storage unit that stores at least one of a clipping condition in the signal processing unit and a condition for detecting and tracking the moving object in the first pixel region, wherein the signal processing unit detects and tracks the moving object and clips the second pixel region according to the condition stored in the storage unit.

(10) The imaging device according to (9), wherein the storage unit stores information on whether or not to detect and track the moving object, information on initial coordinates and size of the second pixel region, and information for detecting the moving object in the first pixel region.

(11) The imaging device according to (10), wherein the information for detecting the moving object in the first pixel region includes at least one of: time information for determining that the moving object that has been tracked has disappeared from the first pixel region; information on a color filter used for generating image data for facilitating detection and tracking of the moving object; information on a threshold value when generating the image data; and information on a threshold value of a size of the moving object.

(12) The imaging device according to any one of (1) to (11), further including: an output rate control unit that controls an output rate when the pixel data output from the signal processing unit is externally output according to a size of the second pixel region.

(13) The imaging device according to any one of (1) to (12), wherein the pixel array unit has the plurality of pixel circuits arranged in a first direction and a second direction, and the pixel array unit clips the first pixel region along at least one of the first direction and the second direction.

(14) The imaging device according to any one of (1) to (12), wherein the pixel array unit has the plurality of pixel circuits arranged in a first direction and a second direction, the pixel array unit clips the first pixel region along the first direction, and the signal processing unit clips the second pixel region from the first pixel region along the second direction.

(15) An imaging system including: an imaging device; and an information processing device that inputs a condition for clipping a pixel region and a condition for detecting and tracking a moving object to the imaging device, the imaging device including: a pixel array unit that has a plurality of pixel circuits and can clip a first pixel region which is a part of an effective pixel region and output pixel data in the first pixel region; and a signal processing unit that detects and tracks a moving object in the first pixel region based on the pixel data output from the pixel array unit, clips a second pixel region which is a part of the first pixel region, and outputs pixel data in the second pixel region.

(16) An imaging method including: clipping a first pixel region which is a part of an effective pixel region from a pixel array unit having a plurality of pixel circuits; and outputting pixel data in the first pixel region, detecting and tracking a moving object in the first pixel region based on the output pixel data, clipping a second pixel region which is a part of the first pixel region, and outputting pixel data in the second pixel region.

The aspects of the present disclosure are not limited to the individual embodiments described above and include various modification examples that can be conceived by those skilled in the art, and effects of the present disclosure are not limited to the above-described content. That is, various additions, changes, and partial deletions can be performed without departing from the conceptual idea and spirit of the present disclosure derived from content specified in the claims and equivalents thereof.

REFERENCE SIGNS LIST

1 Imaging device
2 Pixel array unit
3 Signal processing unit
4 Clipping driving unit
5 First clipping unit
6 Thinning unit
7 Moving object detection unit
8 Clipping control unit
9 Second clipping unit
10 Coordinate calculation unit
11 Effective pixel region
12 First pixel region
13 Second pixel region
14 Moving object
20 Imaging system
21 Signal processing chip
22 External control unit
24 Storage unit
25 First processing unit
26 Second processing unit
27 Output I/F unit
31 Inspection target object
32 Belt conveyor
33 Display device

The invention claimed is:

1. An imaging device comprising:
a pixel array circuitry including a plurality of pixel circuits, the pixel array circuitry configured to
  perform a first clipping operation on first pixel data with respect to a first pixel region within an effective pixel region, the first pixel region being less than all of the effective pixel region, and
  output the first pixel data that is clipped by the first clipping operation; and
a signal processing circuitry configured to
  detect and track a moving object in the first pixel region based on the first pixel data that is clipped by the first clipping operation,
  perform a second clipping operation on a portion of the first pixel data that is clipped by the first clipping operation, the portion of the first pixel data is with respect to a second pixel region within the first pixel region, and the second pixel region is less than all of the first pixel region, and
  output the portion of the first pixel data that is clipped by the second clipping operation, wherein
  to output the portion of the first pixel data, the signal processing circuitry is further configured to thin the first pixel data in the first pixel region to generate the portion of the first pixel data with decreased resolution relative to the first pixel data, and
  to detect and track the moving object in the first pixel region based on the first pixel data that is clipped by the first clipping operation, the signal processing circuitry is further configured to detect and track the moving object in the first pixel region based on the portion of the first pixel data that is clipped by the second clipping operation.

2. The imaging device according to claim 1, wherein
the signal processing circuitry is further configured to perform the second clipping operation without degrading a pixel resolution of the portion of the first pixel data.

3. The imaging device according to claim 1, wherein
when the moving object is present in the first pixel region, the signal processing circuitry is further configured to perform the second clipping operation so as to follow a position of the moving object.

4. The imaging device according to claim 1, wherein
the signal processing circuitry is further configured to detect and track the moving object based on the first pixel data that is clipped by the first clipping operation.

5. The imaging device according to claim 1, wherein
the signal processing circuitry is further configured to output a signal indicating a range in which the pixel array circuitry clips from the effective pixel region in a next frame based on a position of the moving object in the first pixel region, and
the pixel array circuitry is further configured to perform the first clipping operation based on the signal that is output from the signal processing circuitry.

6. The imaging device according to claim 5, wherein
the signal processing circuitry includes:
  a first processing circuitry configured to detect and track the moving object based on the first pixel data that is clipped by the first clipping operation; and a second processing circuitry configured to perform the second clipping operation based on a signal indicating a result of detecting and tracking the moving object obtained by the first processing circuitry.

7. The imaging device according to claim 6, further comprising:
a clipping driving circuitry configured to control the first pixel region output by the pixel array circuitry for each frame, wherein
the first processing circuitry is further configured to
output first control information indicating a range to be clipped with respect to the first pixel region to the second processing circuitry, and
output second control information indicating the range of the first pixel region to be clipped with respect to the effective pixel region to the clipping driving circuitry.

8. The imaging device according to claim 7, wherein
the first processing circuitry is further configured to
set a tracking detection frame in the first pixel region,
responsive to the moving object being detected in the tracking detection frame, perform a process of moving the tracking detection frame according to a position of the moving object in the first pixel region, and
output the first control information and the second control information.

9. The imaging device according to claim 1, further comprising:
a storage circuitry configured to store at least one of a clipping condition in the signal processing circuitry and a condition for detecting and tracking the moving object in the first pixel region, wherein
the signal processing circuitry is further configured to detect and track the moving object and perform the second clipping operation according to the condition stored in the storage circuitry.

10. The imaging device according to claim 9, wherein
the storage circuitry is further configured to store information on whether to detect and track the moving object, information on initial coordinates and size of the second pixel region, and information for detecting the moving object in the first pixel region.

11. The imaging device according to claim 10, wherein
the information for detecting the moving object in the first pixel region includes at least one of:
time information for determining that the moving object that has been tracked has disappeared from the first pixel region;
information on a color filter used for generating image data for facilitating detection and tracking of the moving object;
information on a threshold value when generating the image data; and
information on a threshold value of a size of the moving object.

12. The imaging device according to claim 1, further comprising:
an output rate control circuitry configured to control an output rate when the portion of the first pixel data that is output from the signal processing circuitry is externally output according to a size of the second pixel region.

13. The imaging device according to claim 1, wherein
the plurality of pixel circuits is arranged in a first direction and a second direction, and
the pixel array circuitry is further configured to perform the first clipping operation on the first pixel data with respect to the first pixel region along at least one of the first direction and the second direction.

14. The imaging device according to claim 1, wherein
the plurality of pixel circuits is arranged in a first direction and a second direction,
the pixel array circuitry is further configured to perform the first clipping operation on the first pixel data with respect to the first pixel region along the first direction, and
the signal processing circuitry is further configured to perform the second clipping operation on the portion of the first pixel data with respect to the second pixel region along the second direction.

15. The imaging device according to claim 1, wherein
a width of the first pixel region is the same as a width of the effective pixel region,
a height of the first pixel region is different from a height of the effective pixel region,
a width of the second pixel region is different from the width of the effective pixel region and the width of the first pixel region, and
a height of the second pixel region is the same as the height of the first pixel region.

16. The imaging device according to claim 1, wherein
a width of the first pixel region is different from a width of the effective pixel region,
a height of the first pixel region is the same as a height of the effective pixel region,
a height of the second pixel region is different from the height of the effective pixel region and the height of the first pixel region, and
a width of the second pixel region is the same as the width of the first pixel region.

17. An imaging system comprising:
an imaging device; and
an information processing device that inputs a condition for clipping a pixel region and a condition for detecting and tracking a moving object to the imaging device,
the imaging device including:
a pixel array circuitry including a plurality of pixel circuits, the pixel array circuitry is configured to
perform a first clipping operation on first pixel data with respect to first pixel region within an effective pixel region, the first pixel region being less than all of the effective pixel region, and
output the first pixel data that is clipped by the first clipping operation; and
a signal processing circuitry configured to
detect and track a moving object in the first pixel region based on the first pixel data that is clipped by the first clipping operation,
perform a second clipping operation on a portion of the first pixel data that is clipped by the first clipping operation, the portion of the first pixel data is with respect to a second pixel region within the first pixel region, and the second pixel region is less than all of the second pixel region, and
output the portion of the first pixel data that is clipped by the second clipping operation, wherein
to output the portion of the first pixel data, the signal processing circuitry is further configured to thin the first pixel data in the first pixel region to generate the portion of the first pixel data with decreased resolution relative to the first pixel data, and to detect and track the moving object in the first pixel region based on the first pixel data that is clipped by the first clipping operation, the signal processing circuitry is further configured to detect and track the moving object in the first pixel region based on the portion of the first pixel data that is clipped by the second clipping operation.

18. The imaging system according to claim 17, wherein the signal processing circuitry is further configured to perform the second clipping operation without degrading a pixel resolution of the portion of the first pixel data.

19. An imaging method comprising:

performing, with a pixel array circuitry, a first clipping operation on first pixel data with respect to a first pixel region within an effective pixel region of a plurality of pixel circuits, the pixel array circuitry including the plurality of pixel circuits, and the first pixel region being less than all of the effective pixel region; and outputting, with the pixel array circuitry, the first pixel data that is clipped by the first clipping operation;

detecting and tracking, with a signal processing circuitry, a moving object in the first pixel region based on the first pixel data that is clipped by the first clipping operation;

performing, with the signal processing circuitry, a second clipping operation on a portion of the first pixel data with respect to a second pixel region within the first pixel region, and the second pixel region is less than all of the first pixel region; and outputting, with the signal processing circuitry, the portion of the first pixel data that is clipped by the second clipping operation, wherein outputting the portion of the first pixel data further includes thinning the first pixel data in the first pixel region to generate the portion of the first pixel data with decreased resolution relative to the first pixel data, and detecting and tracking the moving object in the first pixel region based on the first pixel data that is clipped by the first clipping operation further includes detecting and tracking the moving object in the first pixel region based on the portion of the first pixel data that is clipped by the second clipping operation.

20. The imaging method according to claim 19, wherein the second clipping operation is performed without degrading a pixel resolution of the portion of the first pixel data.

* * * * *